(12) United States Patent
Nakamata et al.

(10) Patent No.: US 7,596,357 B2
(45) Date of Patent: Sep. 29, 2009

(54) HIGH-FREQUENCY SWITCHING CIRCUIT, HIGH-FREQUENCY MODULE, AND WIRELESS COMMUNICATIONS DEVICE

(75) Inventors: Katsuro Nakamata, Kokubu (JP); Hiroshi Ninomiya, Kokubu (JP); Masafumi Horiuchi, Kokubu (JP); Shinji Isoyama, Kokubu (JP); Tooru Takahashi, Kokubu (JP)

(73) Assignee: Kyocera Corporation, Kyoto (JP)

( * ) Notice: Subject to any disclaimer, the term of this patent is extended or adjusted under 35 U.S.C. 154(b) by 710 days.

(21) Appl. No.: 11/067,520

(22) Filed: Feb. 25, 2005

(65) Prior Publication Data

US 2005/0197095 A1    Sep. 8, 2005

(30) Foreign Application Priority Data

Feb. 27, 2004  (JP)  ............................. 2004-054530
May 27, 2004  (JP)  ............................. 2004-158431
May 27, 2004  (JP)  ............................. 2004-158432
Sep. 30, 2004  (JP)  ............................. 2004-287422

(51) Int. Cl.
    *H04B 1/44*    (2006.01)
(52) U.S. Cl. ......................................... 455/78; 455/83
(58) Field of Classification Search .............. 455/67.11, 455/63.3, 78, 83, 191.3, 560, 3.04, 428, 13.3, 455/26.1
    See application file for complete search history.

(56) References Cited

U.S. PATENT DOCUMENTS 6,252,463 B1 *  6/2001  Kobayashi ................... 330/311
2002/0090974 A1  7/2002  Hagn

FOREIGN PATENT DOCUMENTS

JP    2002-185356    6/2002
JP    2002-290257    10/2002

* cited by examiner

*Primary Examiner*—Eugene Yun
(74) *Attorney, Agent, or Firm*—Hogan & Hartson LLP

(57) ABSTRACT

The present invention provides a high-frequency switching circuit comprising: two or more high-frequency switches SW1 and SW2 provided correspondingly to a plurality of communication systems having mutually different frequency bands; and a control circuit DEC1 adapted to control the switching of the two or more high-frequency switches SW1 and SW2, in which a common antenna terminal ANT3 and common terminals ANT1 and ANT2 of the respective high-frequency switches SW1 and SW2 are connected via a matching circuit MAT1 having a filtering function capable of allowing passage of direct current. When one path of the high-frequency switch SW1 is turned on, the other paths of the high-frequency switch SW1 and all paths of the high-frequency switch SW2 can be turned off.

26 Claims, 17 Drawing Sheets

HIGH-FREQUENCY SWITCHING CIRCUIT, HIGH-FREQUENCY MODULE, AND WIRELESS COMMUNICATIONS DEVICE

BACKGROUND OF THE INVENTION

1. Field of the Invention

The present invention relates to a high-frequency switching circuit, a high-frequency module including the high-frequency switching circuit, and a wireless communications device mounted with the high-frequency module, which are used particular in a multiband-compliant mobile radio terminal preferably.

2. Description of Related Art

In recent years, there have been proposed mobile phones employing a multiband system, mounted with two or more communication systems in a single mobile phone. Multiband mobile phones, which can perform transmission/reception by selecting a communication system suitable for regional characteristics, intended use, etc., are expected to be convenient ones. For example, there exist dual-band mobile phones that have two communication systems of GSM (Global System for Mobile Communication) and DCS (Digital Cellular System) as a plurality of communication systems having mutually different communication bands.

FIG. 16 is a block diagram of a high-frequency module RFM100 in a common GSM/DCS dual-band mobile phone.

The high-frequency module RFM100 comprises a transmission system TX and a reception system RX of the transmission/reception system DCS and a transmission system TX and a reception system RX of the transmission/reception system GSM, as well as a high-frequency switching circuit ASM100 adapted to demultiplex the two-transmission/reception system GSM/DCS having mutually different communication bands into the respective transmission/reception systems GSM and DCS and to switch between the transmission system TX and the reception system RX in each of the transmission/reception systems DCS and GMS.

The GSM transmission system TX provides a transmitted signal amplified in a power amplification circuit AMP100 to the high-frequency switching circuit ASM100 via a matching circuit MAT100 consisting of a low-pass filter. The transmitted signal provided to the high-frequency switching circuit ASM100 passes via a high-frequency switch and a demultiplexing circuit (demultiplexer), as will be described hereinafter, to be transmitted from an antenna ANT as a high-frequency signal. The operation above is applied similarly to the DCS transmission system TX.

On the other hand, the GSM reception system RX extracts a high-frequency signal received by the antenna ANT via the high-frequency switching circuit ASM100, and eliminates spurious signals near the reception band via a band-pass filter BPF300. The signal passes via the band-pass filter BPF300 to be amplified in an RX side low-noise amplifier AMP300 and to be input to a signal processing system. The operation above is applied similarly to the DCS reception system RX.

Meanwhile, in accordance with future developments of the market, it is expected that high-quality transmission of voice data, image data, etc., using a mobile phone unit will be provided, and to respond to these expectations, communication systems capable of transmitting large volumes of data, such as a CDMA (Code Division Multiple Access) system and next-generation communication system UMTS (Universal Mobile Telecommunications System) characterized by high data transmission rates and communication channels multiplexing, have been advancing.

To support a plurality of communication systems as mentioned above, it becomes necessary for a single module to support many more bands. This increases the demands on a multiband system such as GSM850/GSM900/DCS/PCS (Personal Communication Services)/UMTS.

Thus with the advance of band/mode multiplication, if it becomes necessary for a single high-frequency module to support many more bands/modes, certain surface layer area of a substrate with the high-frequency module mounted thereon in proportion to the number of bands/modes is to be required, which requires the high-frequency switching circuit ASM100 to be increasingly downsized.

Meanwhile, with the aim of reducing size and loss, the arrangement utilizing a high-frequency semiconductor switch such as a GaAs-SW (gallium arsenide switch) as a high-frequency switch for switching between transmission and reception in the high-frequency switching circuit ASM100 has recently been examined.

To be compliant with a multiband/multimode system such as GSM850/GSM900/DCS/PCS/UMTS using such a high-frequency semiconductor switch, it is commonly necessary, as shown in FIG. 17, to provide a high-frequency switching circuit ASM comprising: a demultiplexing circuit DIPX1 for demultiplexing a transmission/reception system into ones, respectively, for lower and higher pass bands; a high-frequency switch SW1 connected to the demultiplexing circuit DIPX1 and adapted to switch among a transmission system TX and reception systems RX in the transmission/reception system GSM850/GSM900 for example; and another high-frequency switch SW2 connected to the demultiplexing circuit DIPX1 and adapted to switch among a transmission system TX, reception systems RX, and UMTS in the transmission/reception system DCS/PCS/UMTS, for example. It is noted, in this case, that it is necessary to use a high-frequency switch that has good linearity and satisfies power resistance as the high-frequency switch SW2 to support the two different modes, i.e., GSM system and CDMA or UMTS system.

Also when using no demultiplexing circuit, it is necessary, as shown in FIG. 18, to provide a high-frequency switching circuit ASM comprising a high-frequency switch SW3 connected to an antenna terminal and adapted to switch among transmission systems TX and reception systems RX in the transmission/reception system GSM850/GSM900/DCS/PCS/UMTS.

In the arrangement utilizing the demultiplexing circuit DIPX1 as shown in FIG. 17, it is possible to support many bands by connecting the high-frequency switches SW1 and SW2 increasingly in parallel, whereby it is also possible to avoid increasing the number of terminals (number of transmitting/receiving terminals other than a common terminal) of each of the high-frequency switches SW1 and SW2.

This eliminates the need for designing and manufacturing many kinds of different high-frequency switches, in which is given a great advantage that the designing and manufacturing lead-time for such high-frequency switches or high-frequency modules including the high-frequency switches can be shortened, and further the manufacturing cost thereof can be reduced.

However, an additional part, i.e., the demultiplexing circuit DIPX1 is required, for which it is necessary to provide installation space. Therefore, there occurs a problem in that the above-described request for downsizing cannot be met.

Inserting the demultiplexing circuit DIPX1 also suffers from another problem in that there occurs a passing loss of power between the common antenna terminal and the common terminal of each high-frequency switch in both transmission and reception systems.

On the other hand, in the arrangement including no demultiplexing circuit and increasing the number of terminals in a high-frequency switch as shown in FIG. 18, it is necessary to provide a high-frequency switch according to the number of bands, which is different depending on the specification required. This requires many kinds of high-frequency switches to be designed and manufactured, resulting in many disadvantages.

SUMMARY OF THE INVENTION

Accordingly, it is an object of the present invention to provide a high-frequency switching circuit capable of reducing cost by eliminating the need for designing and manufacturing many kinds of different high-frequency switches and further shortening the designing and manufacturing lead-time for such high-frequency switches or high-frequency switching circuits using the high-frequency switches.

It is also an object of the present invention to provide a high-frequency switching circuit capable of reducing passing loss in the path between a common antenna terminal and a high-frequency switch and of ensuring a large amount of attenuation.

It is a further object of the present invention to provide a low-cost high-frequency module and wireless communications device including a high-frequency switching circuit that supports many bands.

A high-frequency switching circuit according to the present invention comprises: two or more high-frequency switches provided correspondingly to a plurality of communication systems; a control circuit adapted to control the switching of the two or more high-frequency switches; and a matching circuit capable of allowing passage of direct current and provided between antenna side terminals of the respective two or more high-frequency switches and a common antenna terminal, and wherein the control circuit is adapted to control in such a manner that when one path of any of the high-frequency switches is turned on, the other paths of the high-frequency switch and all paths of the other high-frequency switches are turned off.

As described above, the high-frequency switches are connected to the common antenna terminal with no demultiplexing circuit there between via the matching circuit capable of allowing passage of direct current, and the control circuit is adapted to control in such a manner that when any of the high-frequency switches is connected to a terminal connected with a transmission system or a reception system, the other paths of the high-frequency switch and all paths of the other high-frequency switches are turned off. It is thus prevented that a signal flowing into the high-frequency switch via the terminal connected with the transmission system or the reception system intrudes into any other path of the high-frequency switch or any path of the other high-frequency switches. It is, therefore, possible to prevent the level of a signal output from the antenna terminal from decreasing significantly.

Also, with the arrangement above, it is possible to combine the two or more existing high-frequency switches with each other, which eliminates the need for taking the time to design and manufacture many kinds of high-frequency switches or multi-port high-frequency switches having a different number of terminals to be compliant with a multiband/multimode system, and thereby allows components to be standardized, resulting in a reduction in cost as well as designing and manufacturing lead-time for high-frequency switching circuits, and the in designing and manufacturing lead-time for high-frequency modules using the circuits.

In addition, no demultiplexing circuit is required, although conventionally needed in such a circuit arrangement, whereby it is possible to reduce passing loss between the common antenna terminal and a terminal of each high-frequency switch.

Selecting a low-loss circuit as the matching circuit allows a low-loss high-frequency switching circuit to be achieved.

It is preferable that the voltage at the antenna side terminals is 1V or more under the state where the control circuit controls one path of any of the high-frequency switches to be on and the other paths of the high-frequency switch and all paths of the other high-frequency switches to be off. This improves the isolation between the antenna side terminals of the high-frequency switches and the terminals turned off.

Forming each of the high-frequency switches by a semiconductor integrated circuit element allows the size thereof to be reduced in comparison with the conventional case where a plurality of diodes, inductor elements, and capacitor elements composing a high-frequency switch are mounted on the upper surface of a multi-layer substrate or formed inside thereof. The number of parts composing the switch is also reduced to allow the manufacturing process to be shortened. The cost can be reduced with the reduction in the size as well as the shortening of the manufacturing process.

Also, the matching circuit is adapted to match the impedance with the antenna, for which is commonly used a low-pass filter due to the assumption that the circuit has the capability of allowing passage of direct current. Arranging low-pass filters in the paths between the common antenna terminal and the respective two or more high-frequency switches can achieve a large amount of attenuation in the range higher than the pass band, and suppress spurious higher harmonics that occur when a large signal is input to the high-frequency switches.

It is preferable to connect a filter circuit for attenuating higher harmonics of a transmitted signal in each of the signal paths from the respective transmitting/receiving terminals of the high-frequency switching circuits via the antenna.

The filter circuit is, for example, a low-pass or a band-pass filter.

Thus inserting the filter circuit can remove higher harmonics from the transmitting power amplifier (not shown). Furthermore, it can attenuate higher harmonic distortion due to the switching in the high-frequency switching circuit in the path from the selection circuit via the antenna effectively. Also, in the case where the transmission and reception systems are provided close to each other inside the high-frequency switching circuit or when connected to the high-frequency switching circuit, and not isolated sufficiently, it is possible to attenuate higher harmonics passing via the transmission and reception systems toward the antenna terminals using the function of the low-pass filters.

The high-frequency switching circuit according to the present invention may also be adapted in such a manner that a demultiplexing circuit for multiplexing and/or demultiplexing transmitted signals and/or a reception signal of each of the communication systems having mutually different pass bands is connected to each terminal other than the antenna side terminals of the high-frequency switches, which is connected with a transmitting circuit and/or a receiving circuit.

To be compliant with a multiband system, connecting the demultiplexing circuit for multiplexing and/or demultiplexing a plurality of transmission and/or reception signals having mutually different pass bands to a certain terminal of each high-frequency switch allows signals to be demultiplexed into a plurality of frequency bands having mutually different pass bands more than the number of switchings by the high-frequency switches.

It is also preferable to provide a high-pass or a band-pass filter for attenuating high-voltage surge between the common antenna terminal and the high-frequency switches.

In such a high-frequency switching circuit, transient high-voltage surge input to the antenna terminal can be attenuated by the high-pass or the band-pass filter, which can improve the reliability against failure of high-frequency semiconductor integrated circuits having lower high-voltage surge resistance relative to passive components. Also, varying element values constituting the high-pass or the band-pass filter can give means for matching the impedance of the antenna terminal to the high-frequency switches.

The high-frequency switching circuit according to the present invention may also be adapted in such a manner that an antenna side terminal of any of the two or more high-frequency switches and the common antenna terminal are connected directly. Even in the case of a direct connection, it is possible to allow passage of direct current between the antenna side terminals of the high-frequency switches and the common antenna terminal.

Therefore, also with the arrangement above, it is possible to ensure the isolation between the antenna side terminals of the high-frequency switches and terminals turned off in the same way as the case where the matching circuit capable of allowing passage of direct current is used for connection.

Further, the antenna side terminals of all the high-frequency switches and the common antenna terminal may be connected directly.

In the case above, although there exists no matching circuit, it is possible to ensure the isolation between the antenna side terminals of the high-frequency switches and terminals turned off.

In addition, a high-frequency switching circuit according to the present invention comprises: two or more high-frequency switches provided correspondingly to a plurality of communication systems; and a control circuit adapted to control the switching of the two or more high-frequency switches, and wherein a part of the terminals other than antenna side terminals of the respective high-frequency switches is opened, connected to a high-impedance element of 500Ω or more, or connected to a high-impedance circuit of 500Ω or more; and the control circuit is adapted to control in such a manner that when any of the high-frequency switches is connected to a terminal connected with the transmission system or the reception system, the other high-frequency switches are connected to the part of the terminals mentioned above.

The control circuit is adapted to control in such a manner that when any of the high-frequency switches is connected to a terminal connected with the transmission system or the reception system, the other high-frequency switches are connected to the terminal with the high-impedance element or the high-impedance circuit connected there to or the open terminal. This control can prevent that a signal flowing into the high-frequency switch via the terminal connected with the transmission system or the reception system intrudes into the other transmission or reception systems via the other high-frequency switches to decrease the level of a signal output from the antenna terminal.

Also, with the arrangement above, it is possible to combine the two or more existing high-frequency switches with each other, which eliminates the need for taking the time to make and/or purchase different kinds of high-frequency switches to be compliant with a multiband/multimode system, resulting in a reduction in cost as well as designing and manufacturing lead-time for high-frequency switching circuits, and in designing and manufacturing lead-time for high-frequency modules using the circuits.

It is noted that the above-mentioned "open terminal" can also be referred to as a terminal with an element having infinite impedance connected thereto. Opening the terminal eliminates the need for adding a new circuit for increasing the impedance, having potential for reduction in the size of the high-frequency switching circuit and reduction in cost.

Further, since the high-impedance element or circuit has a load impedance of 500Ω or more, it is possible to ensure an isolation of 20 dB or more between a terminal connected with the transmission system or the reception system turned on in any of the high-frequency switches and a terminal with the high-impedance element or the high-impedance circuit connected thereto or the open terminal in the other high-frequency switches. It is, therefore, possible to exhibit the above-mentioned effect of preventing intrusion sufficiently.

The effect of preventing intrusion can be exhibited also in a circuit configuration in which the common antenna terminal and the two or more high-frequency switches are connected directly with no demultiplexing circuit therebetween. In this arrangement, the loss in a demultiplexing circuit can be reduced, having potential for reduction in loss in the high-frequency switching circuit.

Also, in a circuit configuration in which a demultiplexing circuit is provided between the common antenna terminal and the two or more high-frequency switches, using a plurality of high-frequency switches having the same composition allows parts to be standardized, having potential for reduction in cost and shortening of the designing lead-time for the high-frequency switches as mentioned above.

Forming each of the high-frequency switches by a semiconductor integrated circuit element further allows the size and power consumption thereof to be reduced.

Also, in a high-frequency module according to the present invention, the above-mentioned high-frequency switching circuit according to the present invention is mounted on the surface of a multi-layer substrate that is formed by laminating a dielectric layer and a conductor layer alternately to achieve the enhancement of functions and reduction in loss as well as the reduction in the size and cost of the entire module.

Further, forming the matching circuit, demultiplexing circuit, and/or filter circuit composing the high-frequency switching circuit inside the multi-layer substrate improves packaging density, which allows many more bands/modes to be supported, having potential for further enhancement of functions and reduction in size of the entire module.

Furthermore, arranging the pattern of the matching circuit formed inside the multi-layer substrate with no overlap when viewed from above the multi-layer substrate can prevent interference between matching circuits, demultiplexing circuits, and/or filter circuits, and thereby achieve good filtering characteristics, having potential for reduction in loss and suppression of higher harmonics.

A wireless communications device according to the present invention, which is mounted with the above-mentioned high-frequency module, is a sophisticated small one supporting many bands/modes.

The above-mentioned or further advantages, characteristics and effects of the present invention will be made clearer

DETAILED DESCRIPTION OF PREFERRED EMBODIMENTS

Figure 1:
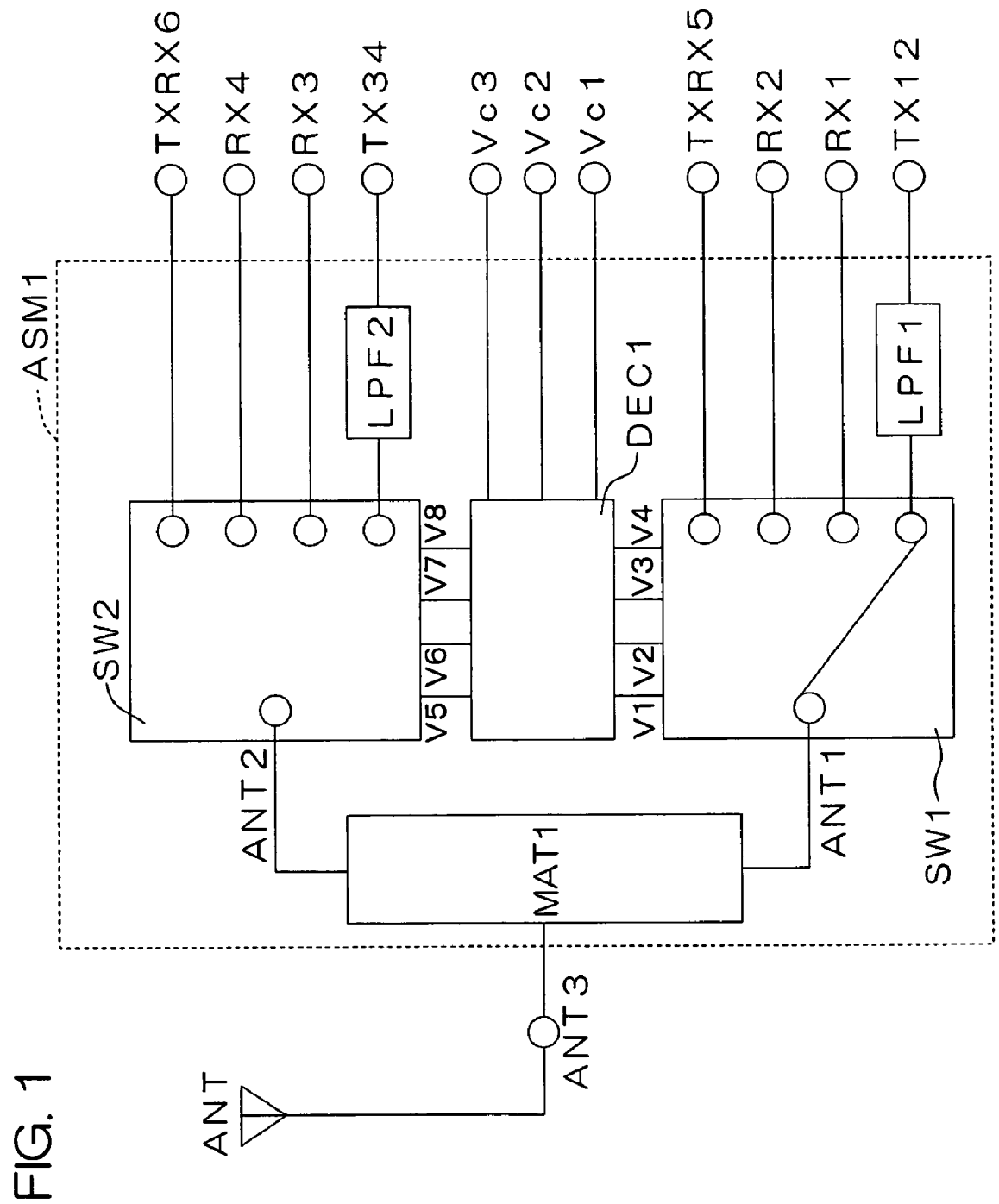
FIG. 1 is a circuit block diagram showing an example of a high-frequency switching circuit according to the present invention.

<High-frequency Switching Circuit>FIG. 1 is a block diagram illustrating an example of a high-frequency switching circuit of a multiband-compliant mobile phone unit according to the present invention.

The high-frequency switching circuit ASM1 is connected to a common antenna terminal ANT3 and is adapted to switch among six communication systems of GSM850 (850 MHz band), GSM900 (900 MHz band), DCS (1800 MHz band), PCS (1900 MHz band), CDMA Cellular (800 MHz band), and UMTS (2100 MHz band).

The high-frequency switching circuit ASM1 comprises a high-frequency switch SW1 adapted to switch among TX12 (GSM850/900-TX), RX1 (GSM850-RX), RX2 (GSM900-RX), and TXRX5 (CDMACellular-TX/RX), and a high-frequency switch SW2 adapted to switch among TX34 (DCS/PCS-TX), RX3 (DCS-RX), RX4 (PCS-RX), and TXRX6 (UMTS-TX/RX).

Both an antenna side terminal ANT1 of the high-frequency switch SW1 and an antenna side terminal ANT2 of the high-frequency switch SW2 are connected to the common antenna terminal ANT3 via an impedance matching circuit MAT1 capable of allowing passage of direct current.

The high-frequency switching circuit ASM1 further comprises a control circuit (hereinafter referred to as "decoder circuit") DEC1 adapted to control the switching state of the two high-frequency switches SW1 and SW2. The decoder circuit DEC1 provides control voltage signals V1 to V4 and V5 to V8 for switching the high-frequency switches SW1 and SW2, respectively, to the high-frequency switches SW1 and SW2. It is noted that the decoder circuit DEC1 may be a decoder circuit that provides a control voltage signal other than the foregoing control voltage signals.

Also, in the path between TX12 and the high-frequency switch SW1 is connected a low-pass filter LPF1 for attenuating higher harmonics of a transmitted signal, while in the path between TX34 and the high-frequency switch SW2 is connected a low-pass filter LPF2 for attenuating higher harmonics of a transmitted signal. These filters LPF1 and LPF2 are low-pass filters arranged with the aim of removing higher harmonics generated in a transmission power amplifier (not shown in the figure).

To the transmission system terminal TX12 of the high-frequency switch SW1 is connected a power amplifier (not shown in the figure), to the reception system terminals RX1 and RX2 are low-noise amplifiers (not shown in the figure), and to the terminal TXRX5 is a duplexer (not shown in the figure). To the transmission system terminal TX34 of the high-frequency switch SW2 is connected a power amplifier (not shown in the figure), to the reception system terminals RX3 and RX4 are low-noise amplifiers (not shown in the figure), and to the terminal TXRX6 is a duplexer (not shown in the figure).

Each of the high-frequency switches SW1 and SW2 utilizes a semiconductor element such as p-HEMT to form a switching circuit pattern, the semiconductor element being mounted on a substrate consisting primarily of a GaAs (Gallium Arsenide) compound, Si (silicon), or $Al_2O_3$ (sapphire)

The decoder circuit DEC1 is also made up of an integrated circuit element, etc.

Figure 4:
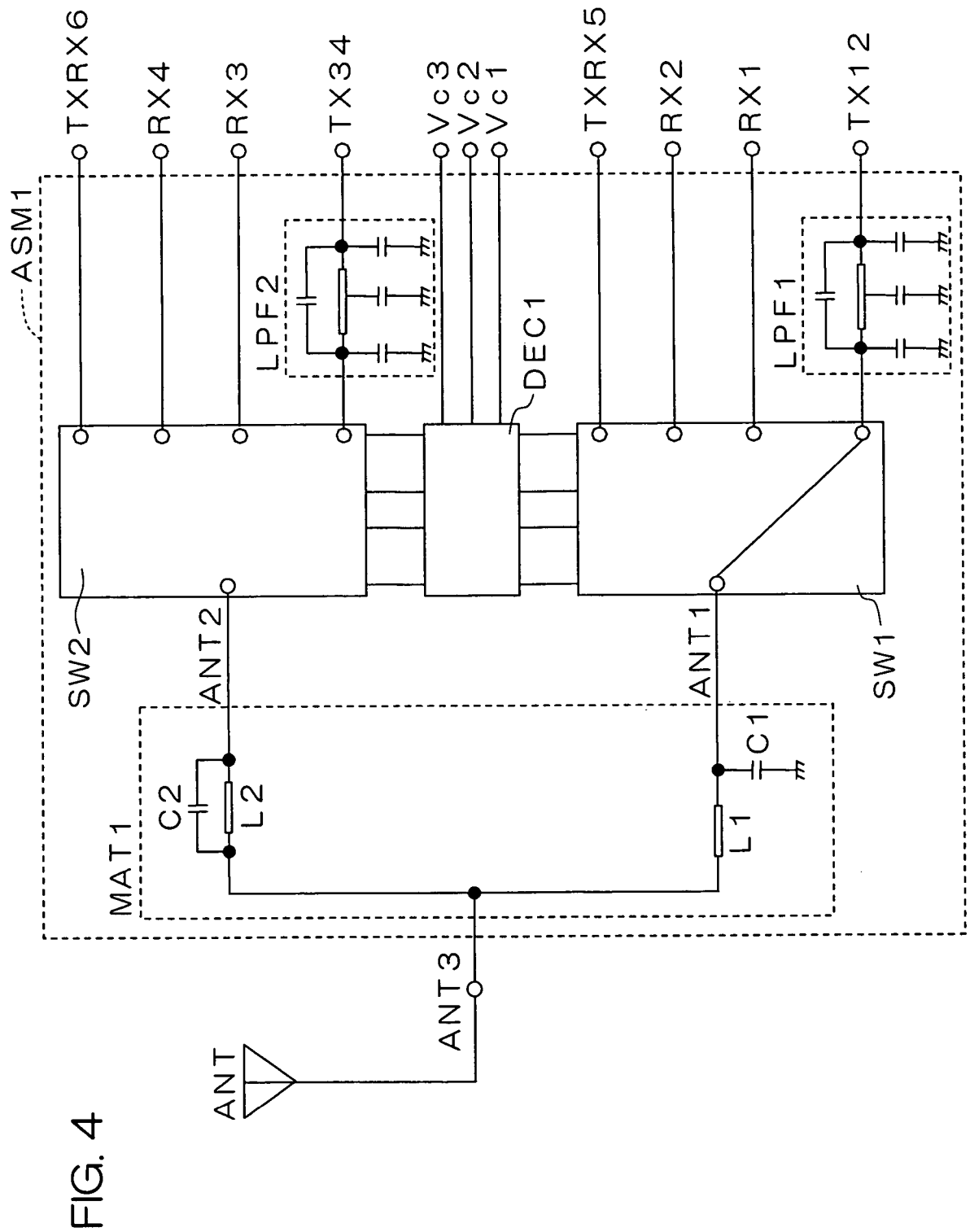
FIG. 4 is a detailed circuit block diagram of the high-frequency switching circuit shown in FIG. 1 according to the present invention.

It is noted that the decoder circuit DEC1 and either or both of the high-frequency switches SW1 and SW2 shown in FIGS. 1 and 4 may be made up of a single integrated circuit element. Thus, the degree of integration is improved to allow the size and the power consumption of the high-frequency switching circuit to be further reduced.

The switching characteristics of the high-frequency switches SW1 and SW2 assumes the following characteristics.

Figure 2:
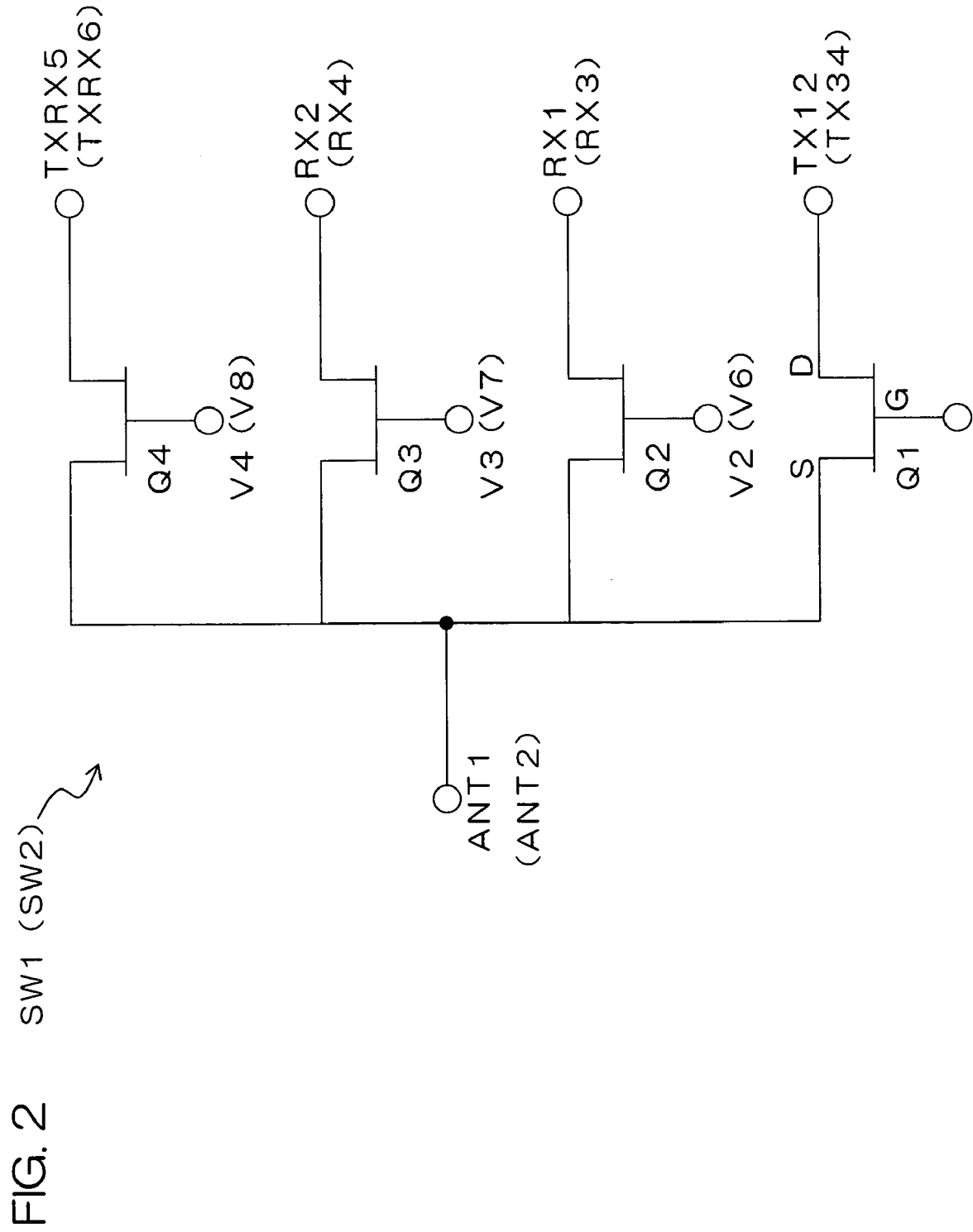
FIG. 2 is a view typically showing the circuit of a high-frequency semiconductor switch.

FIG. 2 is a view typically showing the circuit of the high-frequency switch SW1 (the same is applied to SW2) including switching transistors Q1 to Q4 (referred to generically as Q).

Figure 3:
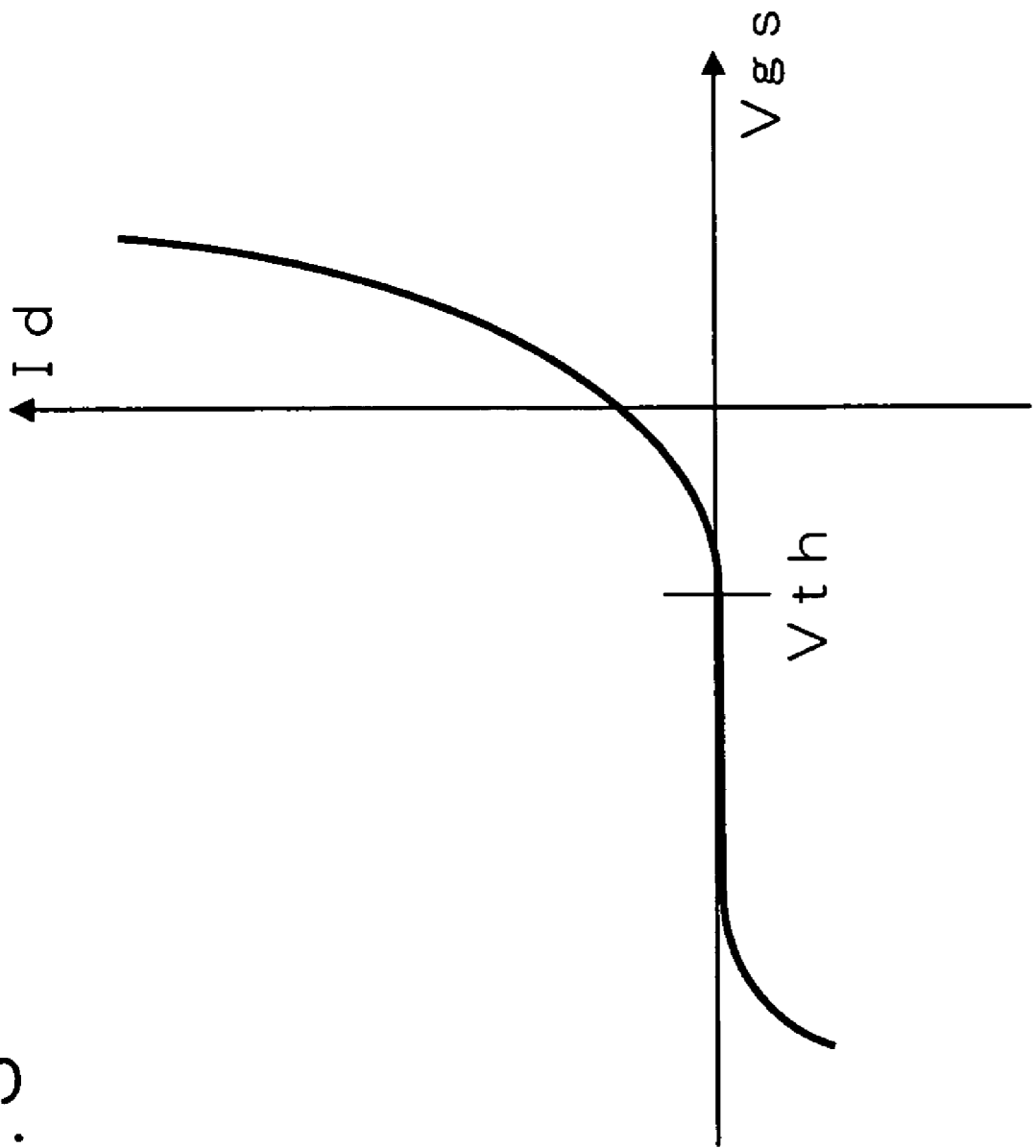
FIG. 3 is a graph showing the basic operation of a transistor composing the high-frequency semiconductor switch.

FIG. 3 is a graph showing the characteristics of the switching transistor Q. The horizontal axis of FIG. 3 represents the gate-source voltage Vgs, while the vertical axis represents the drain current Id. The switching transistor Q is a so-called depression-type one, which can be turned off with a negative gate-source voltage Vgs.

Table 1 shows the relationship between the voltage applied to the antenna side terminal ANT1 (referred to as "control bias voltage" in this specification), the control voltages V1 to V4 provided from the decoder circuit DEC1, and the amount of signal attenuation (hereinafter referred to as "isolation") when passing a signal from the antenna side terminal ANT1 via each terminal (TX12, RX1, RX2, and TXRX5). The values of isolation shown in Table 1 are actual measurements.

In the above-described circuit of the high-frequency switch SW1, in the case where all of the control voltages V1 to V4 provided from the decoder circuit DEC1 are set to Low (0.02V), when a low control bias voltage is applied to the antenna side terminal ANT1, the isolation between the antenna side terminal ANT1 and each terminal (TX12, RX1, RX2, and TXRX5) shows a low value of 8 to 9 dB. Therefore in this case, even if all of the control voltages V1 to V4 are set to Low, no terminal can be turned off.

TABLE 1

|  |  | ANT1[V] |  |  |  |  |  |  |
|---|---|---|---|---|---|---|---|---|
|  |  | 0.03 | 0.41 | 0.75 | 0.93 | 1.0 | 1.16 | 1.5 |
|  |  | V1-V4[V] |  |  |  |  |  |  |
|  |  | 0.02 | 0.02 | 0.02 | 0.02 | 0.02 | 0.02 | 0.02 |
| Isolation [dB] | 900 MHz | 8.2 | 8.4 | 9.3 | 16.6 | 21.8 | 25.6 | 25.8 |
|  | 1750 MHz | 8.3 | 8.4 | 9.3 | 15.4 | 18.0 | 19.8 | 19.9 |
|  | 2170 MHz | 8.3 | 8.4 | 9.2 | 14.0 | 15.8 | 17.2 | 17.4 |

Next, in the case where all of the control voltages V1 to V4 are set to Low (0.02V), applying a high control bias voltage to the antenna side terminal ANT1 allows the isolation between the antenna side terminal ANT1 and each terminal (TX12, RX1, RX2, and TXRX5) to be increased. For example, in accordance with Table 1, when a control bias voltage of 1V or more is applied, it is possible to ensure an isolation of 15 dB or more between the antenna side terminal ANT1 and each terminal (TX12, RX1, RX2, and TXRX5). Therefore, all terminals can be turned off.

Meanwhile, the inventor has made an actual measurement that in the case where any of the control voltages V1 to V4 is set to High (2.5V), the corresponding terminal of the high-frequency switch SW1 becomes conductive, and there appears a certain level of voltage (1V or more) at the antenna side terminal ANT1.

The voltage appearing at the antenna side terminal ANT1 is used as a control bias voltage for the high-frequency switch SW2.

That is, when any of the control voltages V1 to V4 for the high-frequency switch SW1 is set to High (2.5V) to make the corresponding terminal conductive, there appears a control bias voltage at the antenna side terminal ANT1. The control bias voltage can be applied to the antenna side terminal ANT2 of the high-frequency switch SW2 via the impedance matching circuit MAT1 capable of allowing passage of direct current or a wire. Applying the control bias voltage to the high-frequency switch SW2 can keep a large isolation for each terminal (TX34, RX3, RX4, and TXRX6). Therefore, all terminals of the high-frequency switch SW2 can be turned off.

On the contrary, when any of the control voltages V5 to V8 for the high-frequency switch SW2 is set to High (2.5V) to make the corresponding terminal conductive, there appears a control bias voltage at the antenna side terminal ANT2. The control bias voltage can be applied to the antenna side terminal ANT1 of the high-frequency switch SW1 via the impedance matching circuit MAT1 capable of allowing passage of direct current or a wire. Applying the control bias voltage to the high-frequency switch SW1 can keep a large isolation for each terminal (TX12, RX1, RX2, and TXRX5). Therefore, all terminals of the high-frequency switch SW1 can be turned off.

As mentioned above, when a contact of either the high-frequency switch SW1 or the high-frequency switch SW2 is turned on, it is possible to provide a control bias voltage at an antenna input side terminal, and both the other contacts of the high-frequency switch and all contacts of the other high-frequency switch can be turned off.

The present invention utilizes such characteristics of a high-frequency semiconductor switch to allow two high-frequency semiconductor switches, with antenna input side terminals being connected to each other, to operate as a high-frequency semiconductor switch.

Next will be described the operation of the high-frequency switching circuit ASM1 shown in FIG. 1.

In FIG. 1, as mentioned above, the antenna side terminal ANT1 of the high-frequency switch SW1 and the antenna side terminal ANT2 of the high-frequency switch SW2 are connected to the common antenna terminal ANT3, which is connected with an antenna, via the impedance matching circuit MAT1 capable of allowing passage of direct current.

When the antenna side terminal ANT1 is connected to any of the transmitting terminal TX12, receiving terminal RX1, receiving terminal RX2, and transmitting/receiving terminal TXRX5 in the high-frequency switch SW1, the control details of the decoder circuit DEC1 are set such that the transmitting terminal TX34, receiving terminal RX3, receiving terminal RX4, and transmitting/receiving terminal TXRX6 of the high-frequency switch SW2 are all turned off.

Also, when the antenna side terminal ANT2 is connected to any of the transmitting terminal TX34, receiving terminal RX3, receiving terminal RX4, and transmitting/receiving terminal TXRX6 in the high-frequency switch SW2, the control details of the decoder circuit DEC1 are set such that the transmitting terminal TX12, receiving terminal RX1, receiving terminal RX2, and transmitting/receiving terminal TXRX5 of the high-frequency switch SW1 are all turned off.

With the above-described control, in a transmitting operation using GSM850 or GSM900, the high-frequency switch SW1 is controlled in such a manner that the path between TX12 and ANT1 is turned on, and the signal amplified in a power amplifier AMP1 transmits to the common antenna terminal ANT3 that is connected with the antenna ANT. In this case, all contacts of the high-frequency switch SW2 being turned off, the signal amplified in the power amplifier AMP1 never flows into the circuit of TX34 (DCS/PCS-TX), RX3 (DCS-RX), RX4 (PCS-RX), and TXRX6 (UMTS-TX/RX). That is, it can be prevented that part of the signal flowing from the high-frequency switch SW1 via the common antenna terminal ANT3 leaks into a circuit connected with the high-frequency switch SW2 via the high-frequency switch SW2. It is, therefore, possible to prevent the level of a signal output from the common antenna terminal ANT3 from decreasing.

Therefore, no demultiplexing circuit is required, although conventionally needed in the case where two or more high-frequency semiconductor switches are connected in parallel to switch among many bands/modes, whereby it is possible to achieve loss reduction.

Similarly, in a receiving operation using GSM850, when the high-frequency switch SW1 is controlled in such a manner that the path between RX1 and ANT1 is turned on, a reception signal transmits from the common antenna terminal ANT3 to the terminal RX1. Also in this case, since the antenna side terminal ANT1 of the high-frequency switch SW1 and the antenna side terminal ANT2 of the high-frequency switch SW2 are connected via the impedance matching circuit MAT1 capable of allowing passage of direct current, a control bias voltage appearing at the high-frequency switch SW1 can be applied to the antenna side terminal ANT2, whereby each contact of the high-frequency switch SW2 is turned off, and thus it can be prevented that part of the signal flowing from the common antenna terminal ANT3 via the high-frequency switch SW1 leaks into a circuit connected with the high-frequency switch SW2. It is, therefore, possible to prevent the level of the reception signal from decreasing.

The same as in the above can be applied to a receiving operation using GSM900 and the transmitting/receiving terminal TXRX5 in CDMACellular.

Next, in a transmitting operation using DCS/PCS, the high-frequency switch SW2 is controlled in such a manner that the path between TX34 and ANT2 is turned on, and the signal amplified in a power amplifier AMP2 transmits to the common antenna terminal ANT3 that is connected with the antenna. In this case, all contacts of the high-frequency switch SW1 being turned off, the signal amplified in the power amplifier AMP2 never flows into the circuit of TX12 (GSM850/900-TX), RX1 (GSM850-RX), RX2 (GSM900-RX), and TXRX5 (CDMACellular-TX/RX). That is, it can be prevented that part of the signal flowing from the high-frequency switch SW2 via the common antenna terminal ANT3 leaks into a circuit connected with the high-frequency switch SW1 via the high-frequency switch SW1. It is, therefore, possible to prevent the level of a signal output from the common antenna terminal ANT3 from decreasing.

Similarly, in a receiving operation using DCS, when the high-frequency switch SW2 is controlled in such a manner that the path between RX3 and ANT2 is turned on, a reception signal transmits from the common antenna terminal ANT3 to the terminal RX3. Also in this case, since the antenna side terminal ANT2 of the high-frequency switch SW2 and the antenna side terminal ANT1 of the high-frequency switch SW1 are connected via the impedance matching circuit MAT1 capable of allowing passage of direct current, a control bias voltage appearing at the high-frequency switch SW2 can be applied to the antenna side terminal ANT1, whereby each contact of the high-frequency switch SW1 is turned off, and thus it can be prevented that part of the signal flowing from the common antenna terminal ANT3 via the high-frequency switch SW2 leaks into a circuit connected with the high-frequency switch SW1. It is, therefore, possible to prevent the level of the reception signal from decreasing.

The same as in the above can be applied to a receiving operation using PCS and the transmitting/receiving terminal TXRX6 in UMTS.

It is noted that if the high-frequency switch SW1 is made up of a high-frequency semiconductor switch including ports compliant, respectively, for example, with GSM and UMTS, while the high-frequency switch SW2 is also made up of a high-frequency semiconductor switch including ports compliant, respectively, for example, with GSM and UMTS, it is possible to achieve low-loss switching between transmission and reception in a different communication system (GSM/UMTS). Further, linearity required for UMTS and power resistance as well as low-distortion characteristics required for GSM can be achieved in each port of the high-frequency semiconductor switches, which can lead to a multiband/multimode-compliant high-frequency switching circuit.

FIG. 4 is a detailed circuit diagram of the block diagram according to the embodiment shown in FIG. 1.

The impedance matching circuit MAT1 comprises a series distributed constant line L1 and a capacitor C1 provided between the distributed constant line L1 and the ground between the antenna side terminal ANT1 and the common antenna terminal ANT3, and connected to the high-frequency switch SW1 via the distributed constant line L1. The impedance matching circuit MAT1 also comprises a series distributed constant line L2 and a capacitor C2 in parallel to the distributed constant line L2 between the antenna side terminal ANT2 and the common antenna terminal ANT3, and connected to the high-frequency switch SW2 via the distributed constant line L2.

As in the above, the impedance matching circuit MAT1 has a low-pass filtering function capable of allowing passage of direct current. It is noted that the distributed constant line L may be replaced with a chip inductor, while the capacitor C with a chip capacitor.

Figure 5:
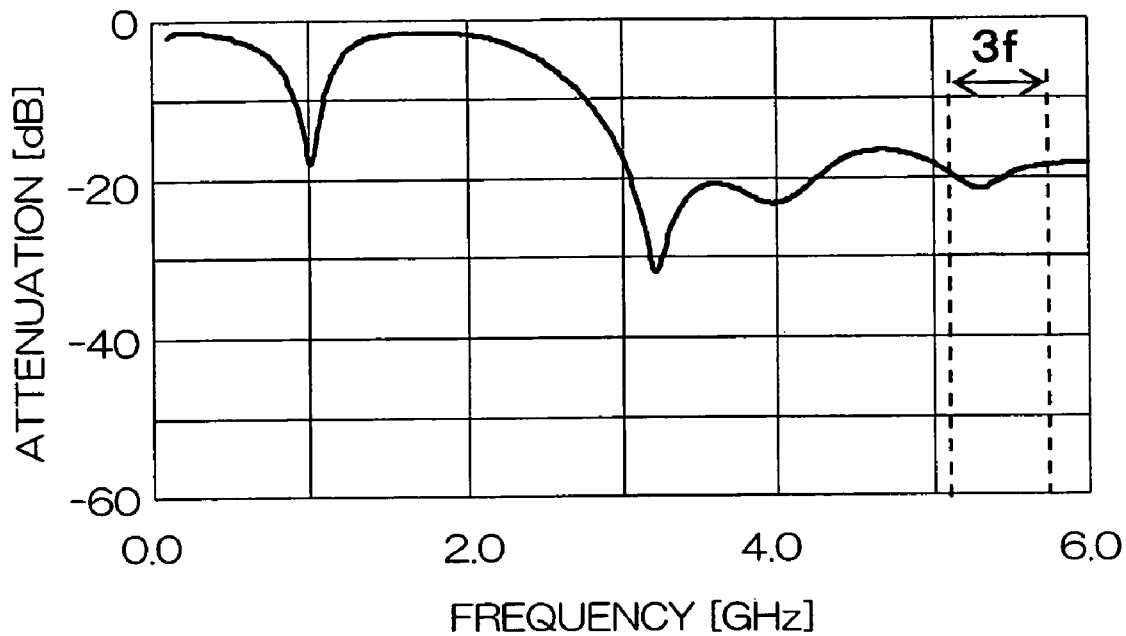
FIG. 5 is a view showing the effect of the present invention according to the existence of a matching circuit having a low-pass filtering function.
Figure 6:
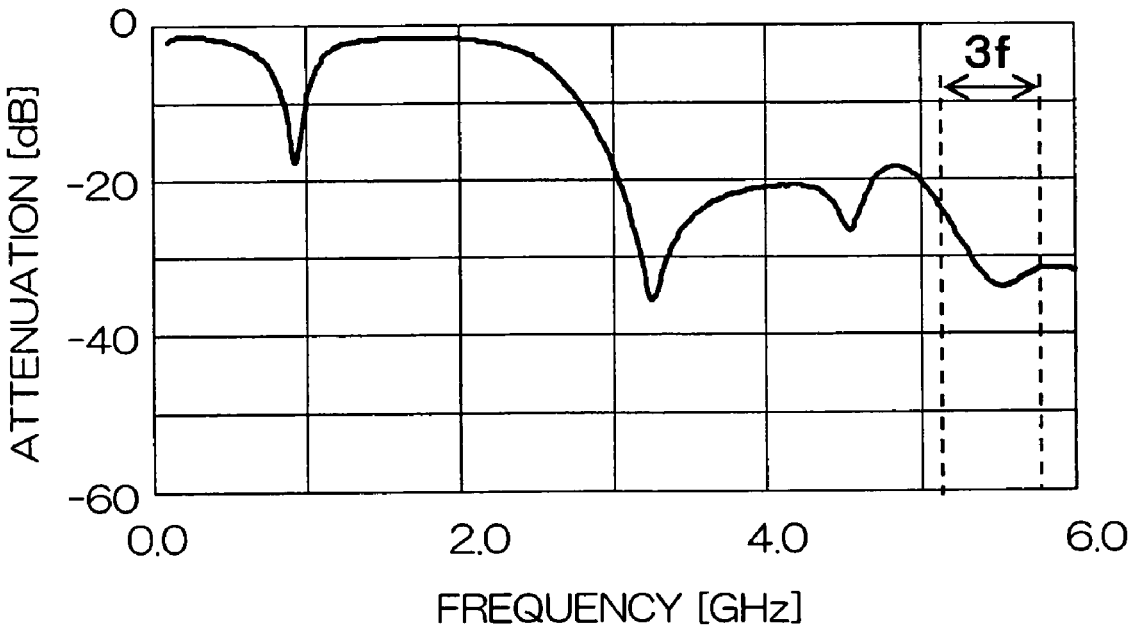
FIG. 6 is also a view showing the effect of the present invention according to the existence of the matching circuit having a low-pass filtering function.

FIGS. 5 and 6 show the improvement effect of pass characteristics by providing the low-pass filtering function to the impedance matching circuit MAT1.

FIG. 5 shows a pass waveform of TX34 when the antenna side terminal ANT2 and the common antenna terminal ANT3 are connected directly. FIG. 6 shows a pass waveform of TX34 when the antenna side terminal ANT2 and the common antenna terminal ANT3 are connected via the impedance matching circuit MAT1 having low-pass filtering function as shown in the circuit diagram of FIG. 4.

In the embodiment corresponding to FIG. 6, the impedance matching circuit is adjusted with the aim of improving the amount of attenuation in a frequency band (5130 to 5730 MHz) three times the pass band (1710 to 1910 MHz) of TX34 (DCS/PCS-TX).

The improvement effect will be described with values. In the case of no matching circuit as shown in FIG. 5, the amount of attenuation is −19.8 dB at 5130 MHz, while being −18.5 dB at 5730 MHz. On the other hand, in the case of having a matching circuit having a low-pass filtering function inserted as shown in FIG. 6, the amount of attenuation is −23.7 dB at 5130 MHz, while being −32.0 dB at 5730 MHz. Therefore, inserting the matching circuit having a low-pass filtering function can exhibit the improvement effect of about −4 to −12 dB in the amount of attenuation.

In the above-mentioned high-frequency switching circuit shown in FIGS. 1 and 4, the impedance matching circuit capable of allowing passage of direct current is provided between the antenna side terminal ANT1 of the high-frequency switch SW1 and the common antenna terminal ANT3 as well as between the antenna side terminal ANT2 of the high-frequency switch SW2 and the common antenna terminal ANT3.

However in the present invention, only between the antenna side terminal ANT2 and the common antenna terminal ANT3 may be provided an impedance matching circuit capable of allowing passage of direct current to connect the antenna side terminal ANT1 and the common antenna terminal ANT3 directly. Also with this arrangement, a control bias voltage can be applied to the antenna side terminal ANT1 and the antenna side terminal ANT2.

On the contrary, only between the antenna side terminal ANT1 and the common antenna terminal ANT3 may be provided an impedance matching circuit capable of allowing passage of direct current to connect the antenna side terminal ANT2 and the common antenna terminal ANT3 directly.

Further, both the antenna side terminal ANT1 and the antenna side terminal ANT2 maybe connected to the common antenna terminal ANT3 directly.

Figure 7:
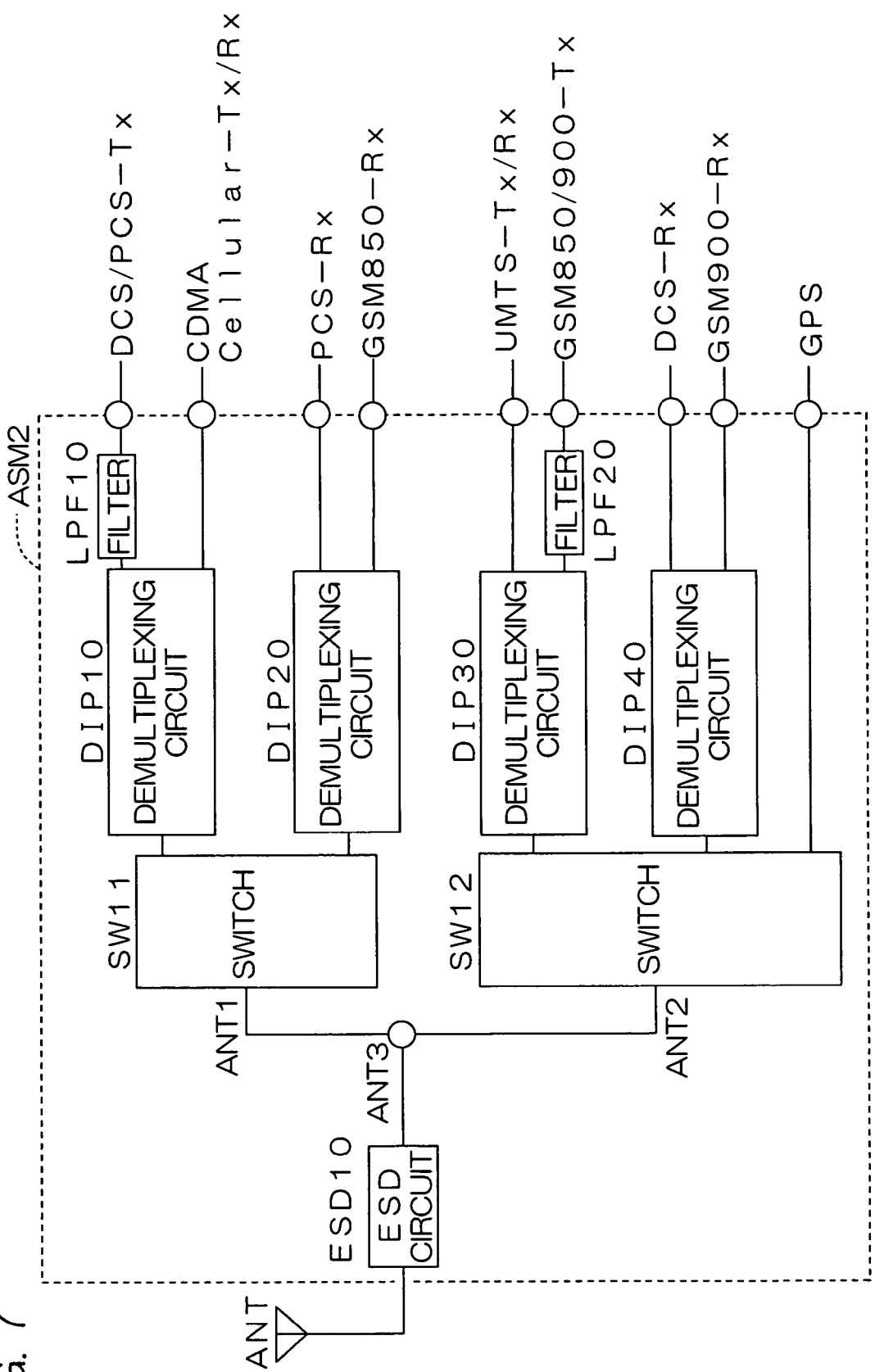
FIG. 7 is a block diagram of a high-frequency switching circuit according to another embodiment of the present invention.

FIG. 7 is a block diagram illustrating an example of a high-frequency switching circuit according to the present invention, in which an antenna side terminal ANT1 and an antenna side terminal ANT2 are connected to a common antenna terminal ANT3 directly.

The high-frequency switching circuit is also characterized in that demultiplexing circuits DIP10 to DIP40 are arranged between receiving terminals and a high-frequency switch SW11 or a high-frequency switch SW112 to further increase the number of ports.

The high-frequency switching circuit supports seven communication systems of GSM850 (850 MHz band), GSM900 (900 MHz band), DCS (1800 MHz band), PCS (1900 MHz band), CDMA Cellular (800 MHz band), UMTS (2000 MHz band), and GPS (1600 MHz band) as an example of a multi-band-compliant circuit.

The high-frequency switching circuit shown in FIG. 7 comprises the high-frequency switch SW11 for demultiplexing a plurality of transmission and/or reception systems having mutually different pass bands into the four respective transmission and/or reception systems of CDMA Cellular-Tx/Rx, DCS/PCS-Tx, GSM850-Rx, and PCS-Rx for the antenna side terminal ANT1 and the high-frequency switch SW112 for demultiplexing a plurality of transmission and/or reception systems having mutually different pass bands into the five respective transmission and/or reception systems of GSM850/900-Tx, UMTS-Tx/Rx, GSM900-Rx, DCS-Rx, and GPS for the antenna side terminal ANT2.

Further, the antenna side terminal ANT1 and the antenna side terminal ANT2 are connected at the common antenna terminal ANT3. Between the common antenna terminal ANT3 and the antenna ANT is connected an ESD circuit ESD10 for attenuating high-voltage surge such as ESD.

To the high-frequency switch SW11 are connected the first demultiplexing circuit DIP10 for demultiplexing/multiplexing CDMA Cellular-Tx/Rx and DCS/PCS-Tx and the second demultiplexing circuit DIP20 for demultiplexing/multiplexing GSM850-Rx and PCS-Rx.

On the other hand, to the high-frequency switch SW12 are connected the third demultiplexing circuit DIP30 for demultiplexing/multiplexing GSM850/900-Tx and UMTS-Tx/Rx and the fourth demultiplexing circuit DIP40 for demultiplexing/multiplexing GSM900-Rx and DCS-Rx.

In addition, between the demultiplexing circuit DIP10 and the terminal DCS/PCS-Tx is connected LPF10 for removing higher harmonics of a transmitted signal, and also between the demultiplexing circuit DIP30 and the terminal GSM850/900-Tx is connected LPF20 for removing higher harmonics of a transmitted signal.

Figure 8:
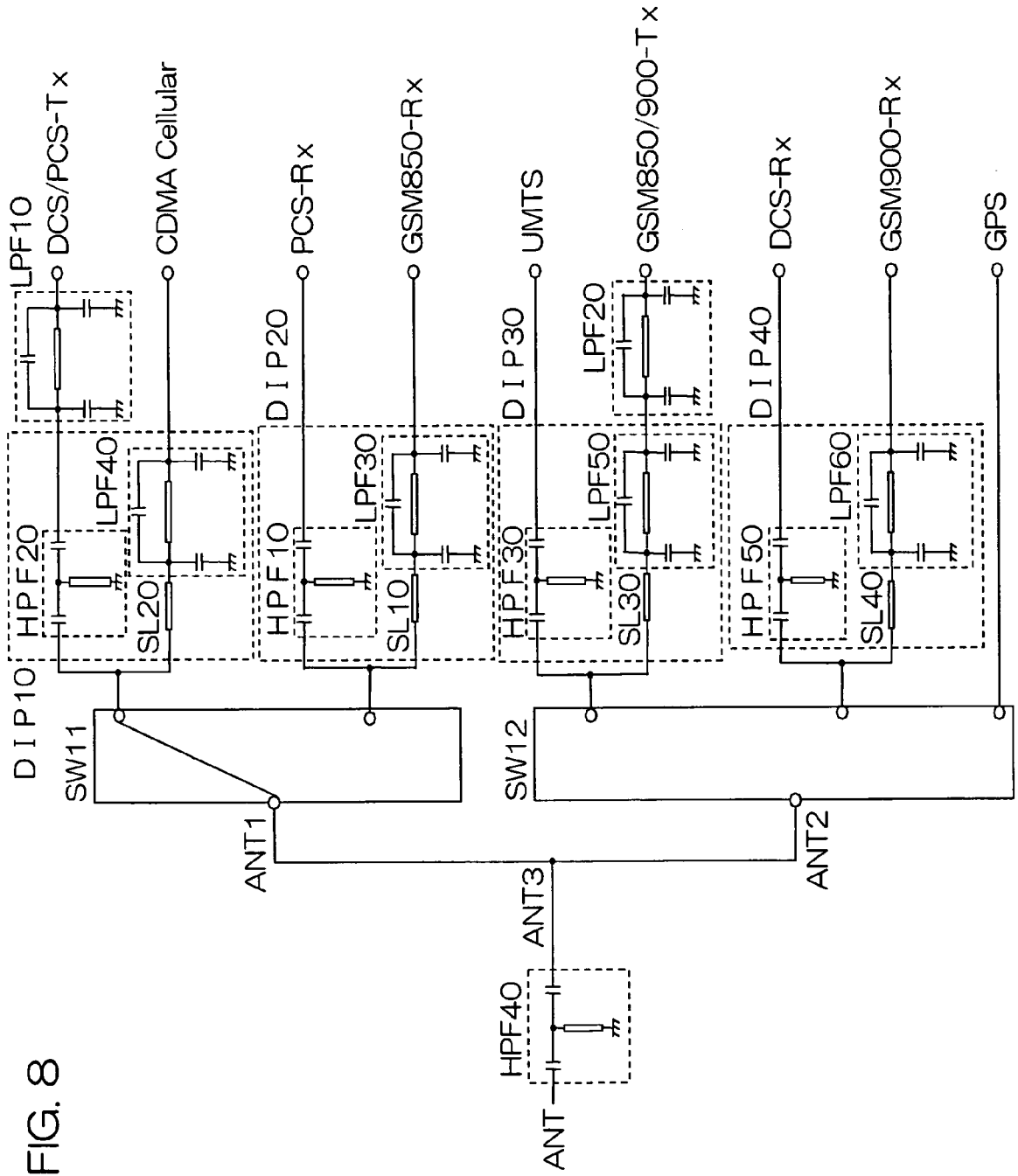
FIG. 8 is a circuit diagram of the high-frequency switching circuit shown in FIG. 7.

FIG. 8 is a detailed circuit diagram of the above-mentioned high-frequency switching circuit. The operation of the circuit shown in FIG. 8 will be described here.

First, in respect to the GPS signal (1600 MHz band), a signal received by the antenna side terminal ANT2 is transmitted to the terminal GPS via the high-frequency switch SW12. Since there is no element other than the high-frequency switch SW12 in the path from the antenna side terminal ANT2 via the receiving terminal GPS, it is possible to achieve low-loss pass characteristics for the GPS signal.

Next, in respect to the CDMA Cellular and DCS/PCS-Tx signals, a CDMA Cellular signal received by the antenna side terminal ANT1 is transmitted to a terminal, which is common to both CDMA Cellular and DCS/PCS-Tx, via the high-frequency switch SW11, and demultiplexed into the terminal CDMA Cellular by the demultiplexing circuit DIP10.

The demultiplexing circuit DIP10 comprises a distributed constant line SL20 and a low-pass filter LPF40 in the path for CDMA Cellular, while a high-pass filter HPF20 in the path for DCS/PCS-Tx. The low-pass filter LPF40 comprises a distributed constant line, a capacitor connected in parallel to the distributed constant line, and capacitors provided between the distributed constant line and the ground. The high-pass filter HPF20 comprises two capacitors connected in series and a distributed constant line provided between the potential between the capacitors and the ground. In the path for DCS/PCS-Tx, between the demultiplexing circuit DIP10 and the terminal DCS/PCS-Tx is provided a low-pass filter LPF10 for attenuating higher harmonics of a transmitted signal. The low-pass filter LPF10 can remove higher harmonic signals generated in a high-frequency power amplifier.

Next, in respect to GSM850-Rx and PCS-Rx signals, a signal received by the antenna side terminal ANT1 is transmitted to a terminal, which is common to both GSM850-Rx and PCS-Rx, via the high-frequency switch SW11, and demultiplexed into each receiving terminal by the demultiplexing circuit DIP20.

The demultiplexing circuit DIP20 comprises a high-pass filter HPF10 in the path for PCS-Rx, while a distributed constant line SL10 and a low-pass filter LPF30 in the path for GSM850-Rx. As shown in the figure, the high-pass filter and the low-pass filter may be configured similarly as HPF20 and LPF10 respectively.

Next, in respect to the GSM850/900-Tx and UMTS signals, an UMTS-Rx signal received by the antenna side terminal ANT2 is transmitted to a terminal, which is common to both GSM850/900-Tx and UMTS, via the high-frequency switch SW112, and demultiplexed into the terminal UMTS by the demultiplexing circuit DIP30.

The demultiplexing circuit DIP30 comprises a high-pass filter HPF30 in the path for UMTS, while a distributed constant line SL30 and a low-pass filter LPF50 in the path for GSM850/900-Tx. As shown in the figure, the high-pass filter and the low-pass filter may be configured similarly as HPF20 and LPF10 respectively. In the path for GSM850/900-Tx, between the demultiplexing circuit DIP30 and the terminal GSM850/900-Tx is provided a low-pass filter LPF20 for attenuating higher harmonics of a transmitted signal. The low-pass filter LPF20 can remove higher harmonic signals generated in a high-frequency power amplifier.

Thus, switching SW12 to use the common terminal and demultiplexing a signal into GSM850/900-Tx and UMTS by the demultiplexing circuit DIP30 allows GSM850/900-Tx and UMTS to be supported simultaneously. That is, the use of the demultiplexing circuit DIP30 allows two bands of GSM850/900-Tx and UMTS to be keep transmitting and receiving simultaneously without switching the switching state.

Finally, in respect to GSM900-Rx and DCS-Rx signals, a signal received by the antenna side terminal ANT2 is transmitted to a terminal, which is common to both GSM900-Rx and DCS-Rx, via the high-frequency switch SW12, and demultiplexed into each receiving terminal by the demultiplexing circuit DIP40.

The demultiplexing circuit DIP40 comprises a high-pass filter HPF50 in the path for DCS-Rx, while a distributed constant line SL40 and a low-pass filter LPF60 in the path for GSM900-Rx. As shown in the figure, the high-pass filter and the low-pass filter may be configured similarly as HPF20 and LPF10 respectively.

Also, between the common antenna terminal ANT3 and the antenna ANT is connected a high-pass filter HPF40 for attenuating high-voltage surge such as ESD. The high-pass filter HPF40 has a function of adjusting the matching between the antenna ANT and the high-frequency switch SW11 as well as the high-frequency switch SW112. As shown in the figure, the high-pass filter HPF40 may be configured similarly as HFP20.

It is noted that if the high-frequency switching circuit according to the present invention is used for a mobile phone, a power amplification circuit, an automatic power control circuit, and a band-pass filter such as a SAW filter, although not shown in the figure, are further connected to each of the terminals GSM850/900-Tx and DCS/PCS-Tx, while a duplexer, a power amplification circuit, an automatic power control circuit, and a band-pass filter such as a SAW filter are connected to each of the terminals CDMA Cellular and UMTS. Further, a band-pass filter such as a SAW filter is connected to each of the terminals GSM850-Rx, GSM900-Rx, DCS-Rx, PCS-Rx, and GPS.

In accordance with the present invention, incorporating the above-mentioned high-frequency module into a wireless communications device such as a mobile phone can provide a multiband-compliant mobile phone in which GMS/DCS/PCS system and CDMA system are integrated, and also can reduce the size of the device, for example.

Next will be described still another example of a high-frequency switching circuit according to the present invention, in which an antenna side terminal ANT1 and an antenna side terminal ANT2 are connected directly.

Figure 9:
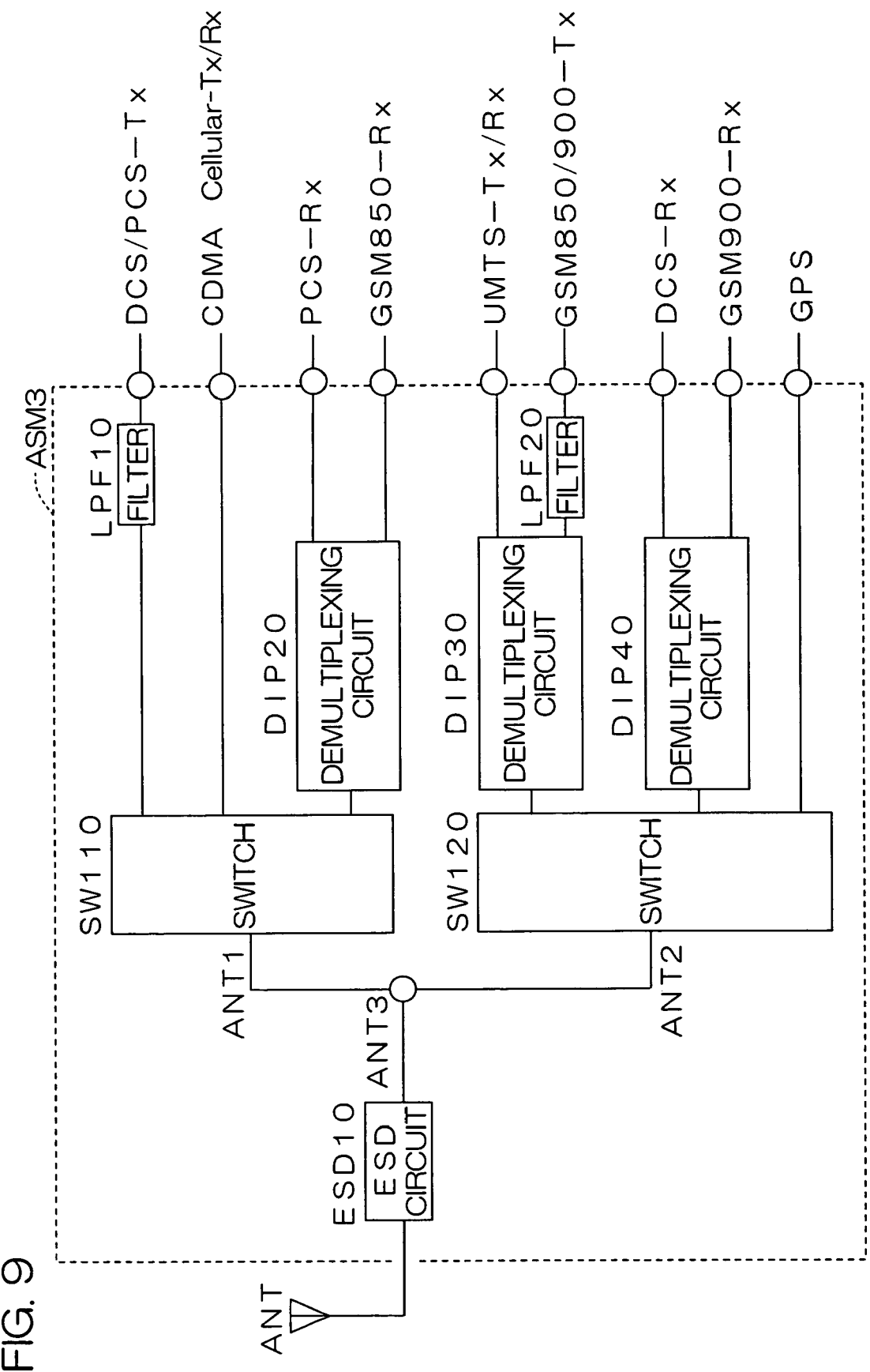
FIG. 9 is a block diagram of a high-frequency switching circuit according to still another embodiment of the present invention.

FIG. 9 is a block diagram showing an example of a high-frequency switching circuit according to the present invention, the high-frequency switching circuit supporting seven communication systems of GSM850 (850 MHz band), GSM900 (900 MHz band), DCS (1800 MHz band), PCS (1900 MHz band), CDMA Cellular (800 MHz band), UMTS (2000 MHz band), and GPS (1600 MHz band) as an example of a multiband-compliant circuit.

The high-frequency switching circuit shown in FIG. 9 comprises a high-frequency switch SW110 for demultiplexing a plurality of transmission and/or reception systems having mutually different pass bands into the four respective transmission and/or reception systems of CDMA Cellular-Tx/Rx, DCS/PCS-Tx, GSM850-Rx, and PCS-Rx and a high-frequency switch SW120 for demultiplexing a plurality of transmission and/or reception systems having mutually different pass bands into the five respective transmission and/or reception systems of GSM850/900-Tx, UMTS-Tx/Rx, GSM900-Rx, DCS-Rx, and GPS. Both the high-frequency switch SW110 and the high-frequency switch SW120 are adapted to switch among three terminals against one common terminal.

To a terminal of the high-frequency switch SW110 is connected a first demultiplexing circuit DIP20 for demultiplexing/multiplexing GSM850-Rx and PCS-Rx.

Also, to a terminal of the high-frequency switch SW120 is connected a second demultiplexing circuit DIP30 for demultiplexing/multiplexing GSM850/900-Tx and UMTS-Tx/Rx, while to another terminal is connected a third demultiplexing circuit DIP40 for demultiplexing/multiplexing GSM900-Rx and DCS-Rx.

Further, between the high-frequency switch SW110 and the terminal DCS/PCS-Tx is connected LPF10 for removing higher harmonics of a transmitted signal, and also between the demultiplexing circuit DIP30 and the terminal GSM850/900-Tx is connected LPF20 for removing higher harmonics of a transmitted signal.

Furthermore, the antenna side terminals ANT1 and ANT2 are connected directly. Between the common antenna terminal ANT3 and the antenna ANT is connected an ESD circuit ESD10 for attenuating high-voltage surge such as ESD.

Figure 10:
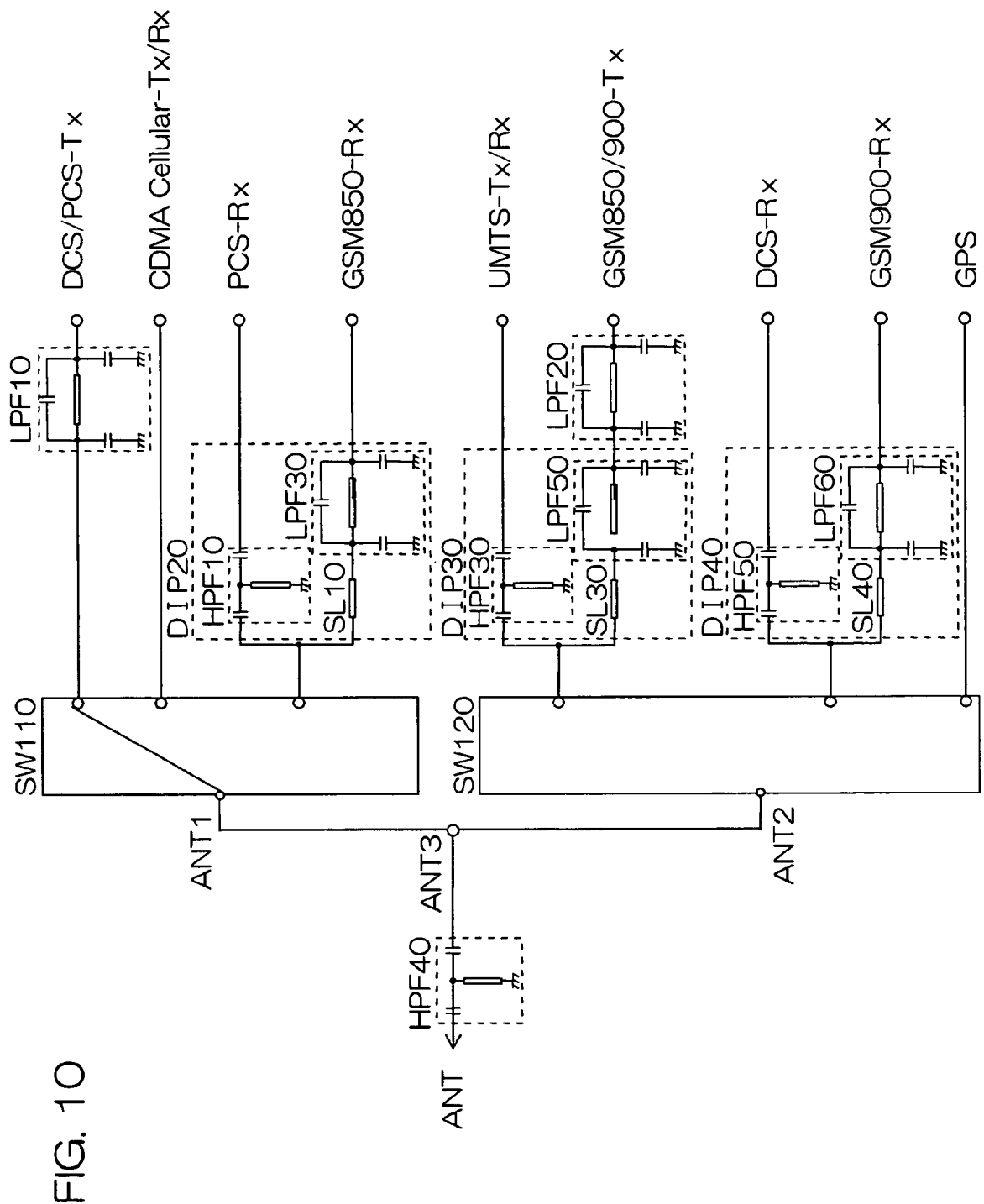
FIG. 10 is a circuit diagram of the high-frequency switching circuit shown in FIG. 9.

FIG. 10 is a specific circuit diagram of the high-frequency switching circuit shown in FIG. 9.

First, in respect to the GPS signal, a signal received by the antenna side terminal ANT2 is transmitted to the terminal GPS via the high-frequency switch SW120. Since there is no element other than the high-frequency switch SW120 in the path from the antenna side terminal ANT2 via the receiving terminal GPS, it is possible to achieve low-loss pass characteristics for the GPS signal.

Next, in respect to the DCS/PCS-Tx signal, a DCS/PCS-Tx signal received by the antenna side terminal ANT1 is transmitted to the terminal DCS/PCS-Tx via the high-frequency switch SW110. Between the high-frequency switch SW110 and the terminal DCS/PCS-Tx is provided a low-pass filter LPF10 for attenuating higher harmonics of a transmitted signal.

The low-pass filter LPF10 can remove higher harmonic signals generated in a high-frequency power amplifier.

Next, in respect to the CDMA Cellular-Tx/Rx signal, a CDMA Cellular-Tx/Rx signal received by the antenna side terminal ANT1 is transmitted to the terminal CDMA Cellular-Tx/Rx directly via the high-frequency switch SW110.

Next, in respect to GSM850-Rx and PCS-Rx signals, a signal received by the antenna side terminal ANT1 is transmitted to a terminal, which is common to both GSM850-Rx and PCS-Rx, via the high-frequency switch SW110, and demultiplexed into each receiving terminal by the demultiplexing circuit DIP20. The demultiplexing circuit DIP20 comprises a high-pass filter HPF10 in the path for PCS-Rx, while a distributed constant line SL10 and a low-pass filter LPF30 in the path for GSM850-Rx.

Next, in respect to the GSM850/900-Tx and UMTS-Tx/Rx signals, an UMTS-Rx signal received by the antenna side terminal ANT2 is transmitted to a terminal, which is common to both GSM850/900-Tx and UMTS, via the high-frequency switch SW120, and demultiplexed into the terminals UMTS and GSM850/900-Tx by the demultiplexing circuit DIP30. The demultiplexing circuit DIP30 comprises a high-pass filter HPF30 in the path for UMTS, while a distributed constant line SL30 and a low-pass filter LPF50 in the path for GSM850/900-Tx. In the path for GSM850/900-Tx, between the demultiplexing circuit DIP30 and the terminal GSM850/900-Tx is provided a low-pass filter LPF20 for attenuating higher harmonics of a transmitted signal.

In accordance with the present invention, switching SW120 to use the common terminal and demultiplexing a signal into GSM850/900-Tx and UMTS by the demultiplexing circuit DIP30 allows GSM850/900-Tx and UMTS to be supported simultaneously. That is, the use of the demultiplexing circuit DIP30 allows two bands of GSM850/900-Tx and UMTS to be keep transmitting and receiving simultaneously without switching the switching state.

Finally, in respect to the GSM900-Rx and DCS-Rx signals, a signal received by the antenna side terminal ANT2 is transmitted to a terminal, which is common to both GSM900-Rx and DCS-Rx, via the high-frequency switch SW120, and demultiplexed into each receiving terminal by the demultiplexing circuit DIP40. The demultiplexing circuit DIP40 comprises a high-pass filter HPF50 in the path for DCS-Rx, while a distributed constant line SL40 and a low-pass filter LPF60 in the path for GSM900-Rx.

Also, between the common antenna terminal ANT3 and the antenna ANT is connected a high-pass filter HPF40 for attenuating high-voltage surge such as ESD. The high-pass filter HPF40 has a function of adjusting the matching between the antenna ANT and the high-frequency switch SW110 as well as the high-frequency switch SW120.

In the high-frequency switching circuit according to the present invention, the above-mentioned high-pass filters HPF all comprise two capacitors connected in series and a distributed constant line provided between the potential between the capacitors and the ground, while the above-mentioned low-pass filters LPF all comprise a distributed constant line, a capacitor connected in parallel to the distributed constant line, and capacitors provided between the distributed constant line and the ground.

It is noted that if the high-frequency switching circuit according to the present invention is used for a mobile phone, a power amplification circuit, an automatic power control circuit, and a band-pass filter such as a SAW filter are connected to each of the terminals GSM850/900-Tx and DCS/PCS-Tx.

Also, a duplexer, a power amplification circuit, an automatic power control circuit, and a band-pass filter such as a SAW filter are connected to each of the terminals CDMA Cellular and UMTS.

Further, a band-pass filter such as a SAW filter is connected to each of the terminals GSM850-Rx, GSM900-Rx, DCS-Rx, PCS-Rx, and GPS.

Figure 11:
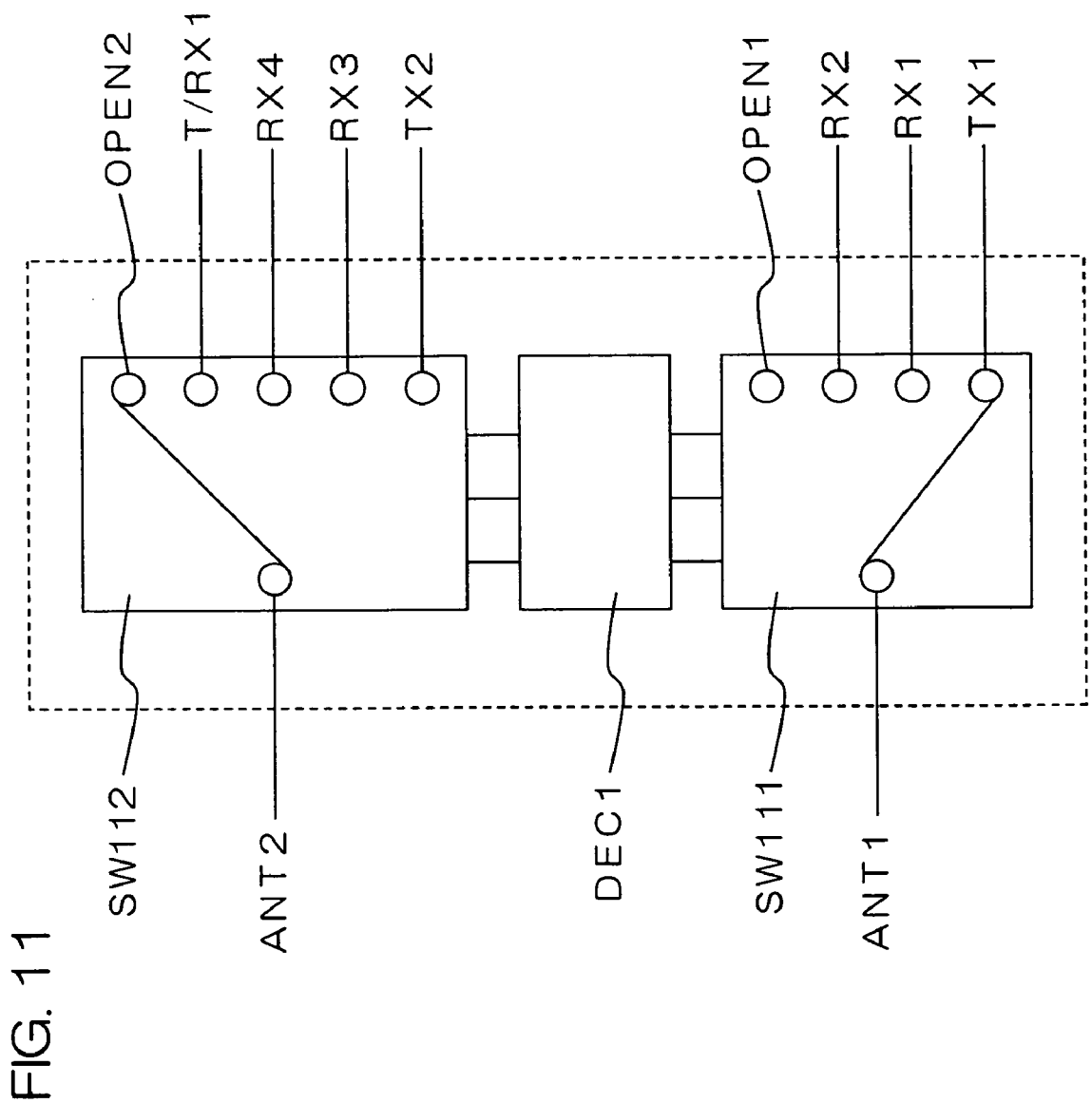
FIG. 11 is a block diagram of high-frequency switches according to the present invention.

FIG. 11 is a block diagram of a switching circuit composing a high-frequency switching circuit according to another embodiment of the present invention.

The switching circuit comprises a Low-band high-frequency switch SW111, a High-band high-frequency switch SW112, and a decoder circuit DEC1 adapted to control the switching state of the two high-frequency switches SW111 and SW112.

The high-frequency switch SW111 is controlled by the decoder circuit DEC1 in such a manner as to switch among a transmitting terminal TX1 common to both GSM850 (850 MHz band) and GSM900 (900 MHz band), a receiving terminal RX1 of GSM850 (850 MHz band), a receiving terminal RX2 of GSM900 (900 MHz band), and an open terminal OPEN1 against an antenna side terminal ANT1 to make a connection therebetween.

The open terminal OPEN1 may be in a state where nothing is connected or a high-impedance element of 500Ω or more (not shown in the figure) The high-impedance element maybe, for example, a resistive element or an LC resonant circuit composed of an inductor L and a capacitor C.

The high-frequency switch SW112 is controlled by the decoder circuit DEC1 in such a manner as to switch among a transmitting terminal TX2 common to both DCS (1800 MHz band) and PCS (1900 MHz band), a receiving terminal RX3 of DCS (1800 MHz band), a receiving terminal RX4 of PCS (1900 MHz band), a transmitting/receiving terminal T/RX1 of UMTS (2000 MHz band), and an open terminal OPEN2 against an antenna side terminal ANT2 to make a connection therebetween.

The open terminal OPEN2 may be in a state where nothing is connected or a high-impedance element of 500Ω or more (not shown in the figure). The high-impedance element may be, for example, a resistive element or an LC resonant circuit composed of an inductor L and a capacitor C.

Each of the high-frequency switches SW111 and SW112 utilizes a semiconductor element to form a switching circuit pattern, the semiconductor element P-HEMT being mounted on a substrate consisting primarily of a GaAs (Gallium Arsenide) compound, Si (silicon), or $Al_2O_3$ (sapphire).

The decoder circuit DEC1 is adapted to control the switching of the high-frequency switches SW111 and SW112, and is made up of an integrated circuit element, etc.

It is noted that the decoder circuit DEC1 and either or both of the high-frequency switches SW111 and SW112 may be made up of a single integrated circuit element. Thus, the degree of integration is improved to allow the size and the power consumption of the high-frequency switching circuit to be further reduced.

Figure 12:
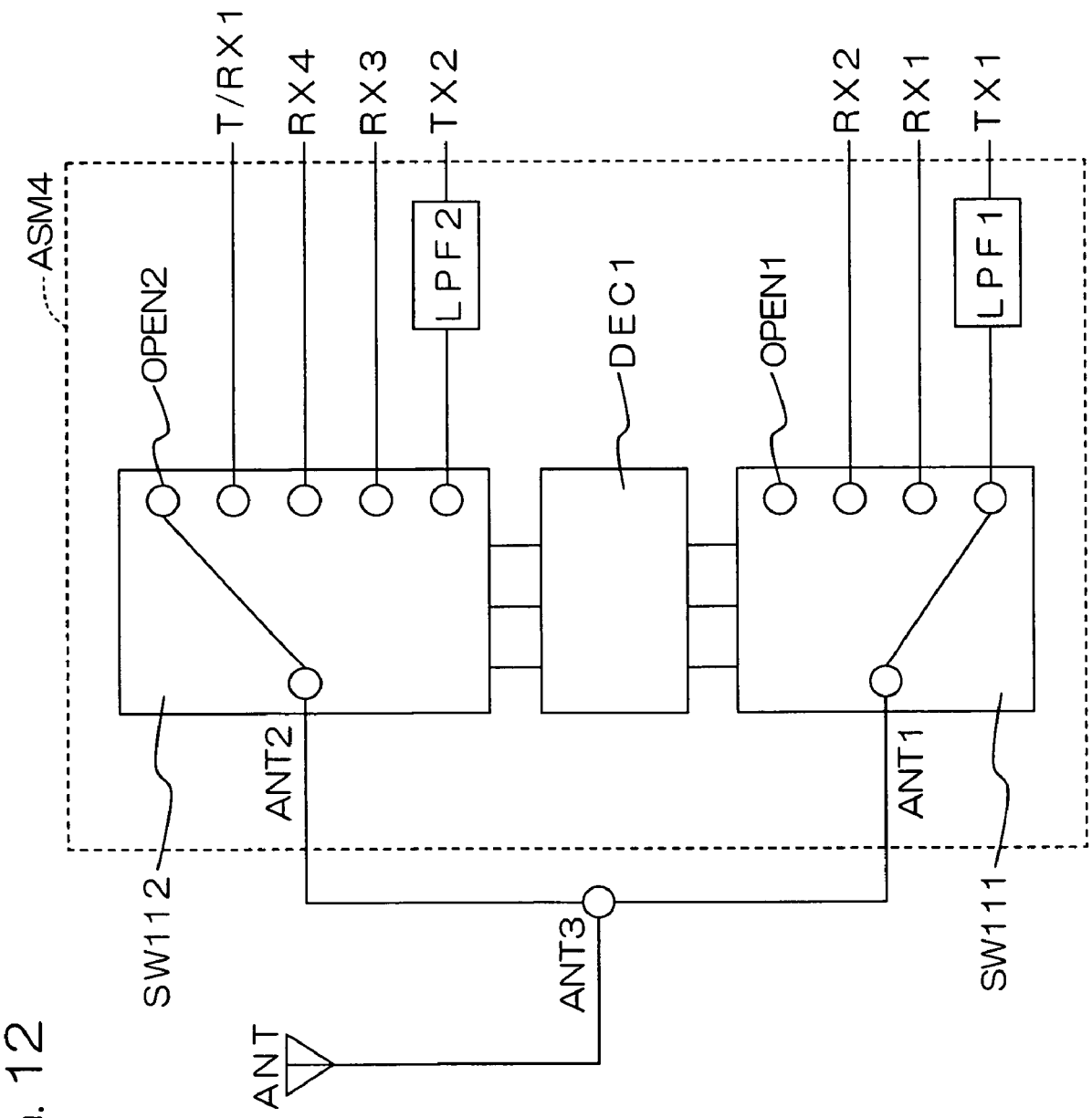
FIG. 12 is a circuit diagram showing an example of a high-frequency switching circuit including the high-frequency switches according to the present invention.

Next will be described the operation of the switching circuit shown in FIG. 11 with reference to a high-frequency switching circuit ASM4 in FIG. 12. FIG. 12 is a connection diagram of the high-frequency switching circuit ASM4.

In FIG. 12, an antenna side terminal ANT1 of the high-frequency switch SW111 and an antenna side terminal ANT12 of the high-frequency switch SW2 are directly connected to a common antenna terminal ANT3 that is connected with an antenna.

To the transmitting terminal TX1 of the high-frequency switch SW111 are connected a low-pass filter LPF1 for removing higher harmonics generated in a power amplifier and a power amplifier AMP1 (not shown in the figure), while to the receiving terminal RX1 is connected a low-noise amplifier AMP3 (not shown in the figure). To the transmitting terminal TX2 of the high-frequency switch SW112 are connected a low-pass filter LPF2 for removing higher harmonics generated in a power amplifier and a power amplifier AMP2 (not shown in the figure), while to the receiving terminal RX3 is connected a low-noise amplifier AMP4 (not shown in the figure). It is noted that to the other transmitting terminals than mentioned above are connected, respectively, power amplifiers, while to the other receiving terminals are connected, respectively, low-noise amplifiers, being omitted in the figure.

When the antenna side terminal ANT1 is connected to any of the transmitting terminal TX1, receiving terminal RX1, and receiving terminal RX2 in the high-frequency switch SW111, the control details of the decoder circuit DEC1 are set such that the terminal OPEN2 is turned on in the high-frequency switch SW2.

Also, when the antenna side terminal ANT2 is connected to any of the transmitting terminal TX2, receiving terminal RX3, receiving terminal RX4, and transmitting/receiving terminal T/RX1 in the high-frequency switch SW112, the control details of the decoder circuit DEC1 are set such that the terminal OPEN1 is turned on in the high-frequency switch SW111.

In a transmitting operation using GSM850 or GSM900, the high-frequency switch SW111 is controlled in such a manner that the path between TX1 and ANT1 is turned on, and the signal amplified in a power amplifier AMP1 transmits to the common antenna terminal ANT3 that is connected with the antenna ANT.

In the case above, the high-frequency switch SW112 is controlled by the above-mentioned decoder circuit DEC1 in such a manner that the terminal OPEN2 is turned on.

The connection above exhibits the following advantage. In the case where the terminal OPEN2 is turned on in the high-frequency switch SW112, the terminal OPEN2 being opened electrically or a load impedance of 500Ω or more being connected thereto, it is possible to ensure an isolation of 20 dB or more between the antenna side terminal ANT2 and the transmitting terminal TX2, receiving terminal RX3, receiving terminal RX4 as well as transmitting/receiving terminal T/RX1 of the high-frequency switch SW112. Thus, it can be prevented that part of the signal flowing from the high-frequency switch SW111 via the common antenna terminal ANT3 leaks into a circuit connected with the high-frequency switch SW112 via the high-frequency switch SW112. It is, therefore, possible to prevent the level of a signal output from the common antenna terminal ANT3 from decreasing.

Similarly, in a receiving operation using GSM850, when the high-frequency switch SW111 is controlled in such a manner that the path between RX1 and ANT1 is turned on, a reception signal transmits from the common antenna terminal ANT3 to the terminal RX1. Also in this case, the terminal OPEN2 is turned on in the high-frequency switch SW112. Since the terminal OPEN2 is opened electrically or a load impedance of 500Ω or more is connected thereto, it is possible to ensure an isolation of 20 dB or more between the antenna side terminal ANT2 and the transmitting terminal TX2, receiving terminal RX3, receiving terminal RX4 as well as transmitting/receiving terminal T/RX1 of the high-frequency switch SW112. Thus, it can be prevented that part of the signal flowing from the common antenna terminal ANT3 via the high-frequency switch SW111 leaks into a circuit connected with the high-frequency switch SW112. It is, therefore, possible to prevent the level of a reception signal from decreasing significantly.

The same as in the above can be applied to a receiving operation using GSM900.

Next, in a transmitting operation using DCS/PCS, when the high-frequency switch SW112 is controlled in such a manner that the path between TX2 and ANT2 is turned on, the signal amplified through a power amplifier AMP2 transmits to the common antenna terminal ANT3. In this case, the terminal OPEN1 is turned on in the high-frequency switch SW111.

The connection above exhibits the following advantage. In the case where the terminal OPEN1 is turned on in the high-frequency switch SW111, the terminal OPEN1 being opened electrically or a load impedance of 500Ω or more being connected thereto, it is possible to ensure an isolation of 20 dB or more between the antenna side terminal ANT1 and the transmitting terminal TX1, receiving terminal RX1 as well as receiving terminal RX2. Thus, it can be prevented that part of the signal flowing from the high-frequency switch SW112 via the common antenna terminal ANT3 leaks into a circuit connected with the high-frequency switch SW111. It is, therefore, possible to prevent the level of a signal output from the common antenna terminal ANT3 from decreasing.

Similarly, in a receiving operation using DCS, when the high-frequency switch SW112 is controlled in such a manner that the path between RX3 and ANT2 is turned on, a reception signal transmits from the common antenna terminal ANT3 to the terminal RX3. Also in this case, the terminal OPEN1 is turned on in the high-frequency switch SW111. Since the terminal OPEN1 is opened electrically or a load impedance of 500Ω or more is connected thereto, it is possible to ensure an isolation of 20 dB or more between the antenna side terminal ANT1 and the transmitting terminal TX1, receiving terminal RX1 as well as receiving terminal RX2. Thus, it can be prevented that part of the signal flowing from the common antenna terminal ANT3 via the high-frequency switch SW112 leaks into a circuit connected with the high-frequency switch SW111. It is, therefore, possible to prevent the level of a reception signal from decreasing significantly. The same as in the above can be applied to a receiving operation using PCS and transmitting and receiving operations using UMTS.

Figure 13:
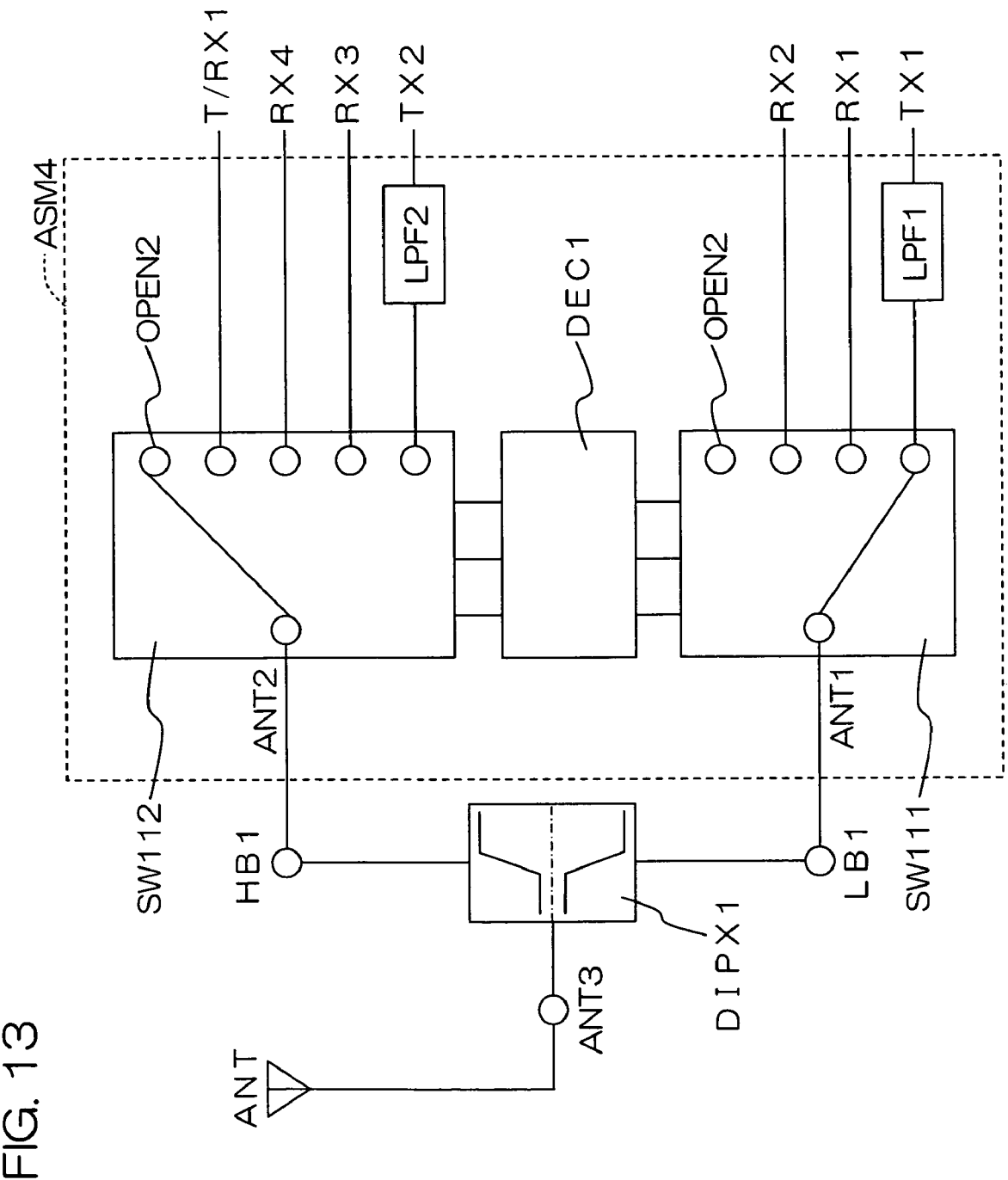
FIG. 13 is a circuit diagram showing another example of the high-frequency switching circuit including the high-frequency switches according to the present invention.

Next will be described the operation of the high-frequency switch shown in FIG. 11 with reference to another circuit shown in FIG. 13. FIG. 13 is a connection diagram of the high-frequency switching circuit ASM4 using a demultiplexing circuit DIPX1.

In FIG. 13, the demultiplexing circuit DIPX1 for demultiplexing a signal into Low frequency bands (GSM850 and GSM900) and High frequency bands (DCS, PCS, and UMTS) is connected between the common antenna terminal ANT3 connected with an antenna and the high-frequency switches. In the demultiplexing circuit DIPX1, the path for Lowbands includes a low-pass filter, while the path for High bands includes a high-pass filter.

To a terminal LB1 of the demultiplexing circuit DIPX1 for getting Low frequency bands therevia is connected the antenna side terminal ANT1 of the high-frequency switch SW111, while to another terminal HB1 of the demultiplexing circuit DIPX1 for getting High frequency bands there via is connected the antenna side terminal ANT2 of the high-frequency switch SW112.

The configuration and connection state of the high-frequency switches SW111 and SW112 are the same as those described with reference to FIG. 12.

The operation of the high-frequency switches shown in FIG. 13 will be described here.

When the antenna side terminal ANT1 is connected to any of the transmitting terminal TX1, receiving terminal RX1, and receiving terminal RX2 in the high-frequency switch SW111, the control details of the decoder circuit DEC1 are set such that the high-frequency switch SW112 is connected to the terminal OPEN2 or a different terminal than the terminal OPEN2, e.g., the transmitting/receiving terminal T/RX1.

Also, when the antenna side terminal ANT2 is connected to any of the transmitting terminal TX2, receiving terminal RX3, receiving terminal RX4, and transmitting/receiving terminal T/RX1 in the high-frequency switch SW112, the control details of the decoder circuit DEC1 are set such that the high-frequency switch SW111 is connected to the terminal OPEN1 or a different terminal than the terminal OPEN1, e.g., the receiving terminal RX2.

For example, in a transmitting operation using GSM850 or GSM900, the high-frequency switch SW111 is controlled in such a manner that the path between TX1 and ANT1 is turned on, and the signal amplified in a power amplifier AMP1 transmits to the common antenna terminal ANT3 that is connected with the antenna ANT via the high-frequency switch SW111 and the demultiplexing circuit DIPX1. In this case, the antenna side terminal ANT2 is connected to, for example, the transmitting/receiving terminal T/RX1 in the high-frequency switch SW112.

Unlike the switching method shown in FIG. 12, it is not necessarily required to turn the terminal OPEN2 on in the high-frequency switch SW112. This is for the reason that between the common antenna terminal ANT3 and the high-frequency switches SW111 and SW112 is arranged the demultiplexing circuit DIPX1, whereby in a Low-band transmitting/receiving operation, the impedance of the High-band systems can be considered infinite.

Since the terminal T/RX1 is turned on in the high-frequency switch SW112, UMTS can be received even in a transmitting operation using GSM850/900.

It is noted that if UMTS is not required to be received simultaneously, it will be appreciated that the control details may be set in such a manner that the terminal OPEN2 is turned on in the high-frequency switch SW112.

Similarly, in a receiving operation using GSM850, when the high-frequency switch SW111 is controlled in such a manner that the path between RX1 and ANT1 is turned on, a reception signal transmits from the common antenna terminal ANT3 to the terminal RX1 via the demultiplexing circuit DIPX1 and the high-frequency switch SW111. In this case, the terminal T/RX1, for example, is turned on in the high-frequency switch SW112.

Unlike the switching method shown in FIG. 12, it is not necessarily required to turn the terminal OPEN2 on in the high-frequency switch SW112. This is for the reason that between the common antenna terminal ANT3 and the high-frequency switches SW111 and SW112 is arranged the demultiplexing circuit DIPX1, whereby in a Low-band transmitting/receiving operation, the impedance of the High-band systems can be considered infinite. The same is applied similarly to a receiving operation using GSM900.

Since the terminal T/RX1 is turned on in the high-frequency switch SW112, UMTS can be transmitted/received even in a receiving operation using GSM850.

It is noted that if UMTS is not required to be transmitted/received simultaneously, it will be appreciated that the control details may be set in such a manner that the terminal OPEN2 is turned on in the high-frequency switch SW112.

Also, in a transmitting operation using DCS/PCS, the high-frequency switch SW112 is controlled in such a manner that the path between TX2 and ANT2 is turned on, and the signal amplified in a power amplifier AMP2 transmits to the common antenna terminal ANT3 via the demultiplexing circuit DIPX1. In this case, the terminal RX2, for example, is turned on in the high-frequency switch SW111.

Unlike the switching method shown in FIG. 12, it is not necessarily required to turn the terminal OPEN1 on in the high-frequency switch SW111. This is for the reason that between the common antenna terminal ANT3 and the high-frequency switches SW111 and SW112 is arranged the demultiplexing circuit DIPX1, whereby in a High-band transmitting operation, the impedance of the Low-band systems can be considered infinite.

Since the terminal RX2 is turned on in the high-frequency switch SW112, GSM900 can be received even in a transmitting operation using DCS/PCS. It is noted that if GSM900 is not required to be transmitted/received simultaneously, the terminal OPEN1 may be turned on in the high-frequency switch SW111.

Similarly, in a receiving operation using DCS, when the high-frequency switch SW112 is controlled in such a manner that the path between RX3 and ANT2 is turned on, a reception signal transmits from the common antenna terminal ANT3 to the terminal RX3 via the demultiplexing circuit DIPX1. In this case, the terminal RX2, for example, is turned on in the high-frequency switch SW111. Since the terminal RX2 is turned on in the high-frequency switch SW111, GSM900 can be received even in a receiving operation using DCS.

It is noted that unlike the switching method shown in FIG. 12, it is not necessarily required to turn the terminal OPEN1 on in the high-frequency switch SW111. This is for the reason that between the common antenna terminal ANT3 and the high-frequency switches SW111 and SW112 is arranged the demultiplexing circuit DIPX1, whereby in a High-band transmitting operation, the impedance of the Low-band systems can be considered infinite. The same is applied similarly to a receiving operation using PCS and a transmitting/receiving operation using UMTS.

As described heretofore, in accordance with the present invention, it is possible to provide two different switching circuit systems using the high-frequency switches SW111 and SW112 having the same configuration.

Thus, it is not necessary to make and/or purchase different high-frequency semiconductor switches, respectively, for different switching circuit systems, although required conventionally, which can reduce the manufacturing cost or the purchasing cost for the high-frequency semiconductor switches. In addition, it is also not necessary to design and make two kinds of different high-frequency semiconductor switches, which can also shorten the manufacturing lead-time for the high-frequency semiconductor switches, and further the designing and manufacturing lead-time for the switching circuits and high-frequency modules including the switching circuits.

<High-frequency Module>

Next, a high-frequency module with the above-mentioned high-frequency switching circuit mounted thereon will be described.

Figure 14:
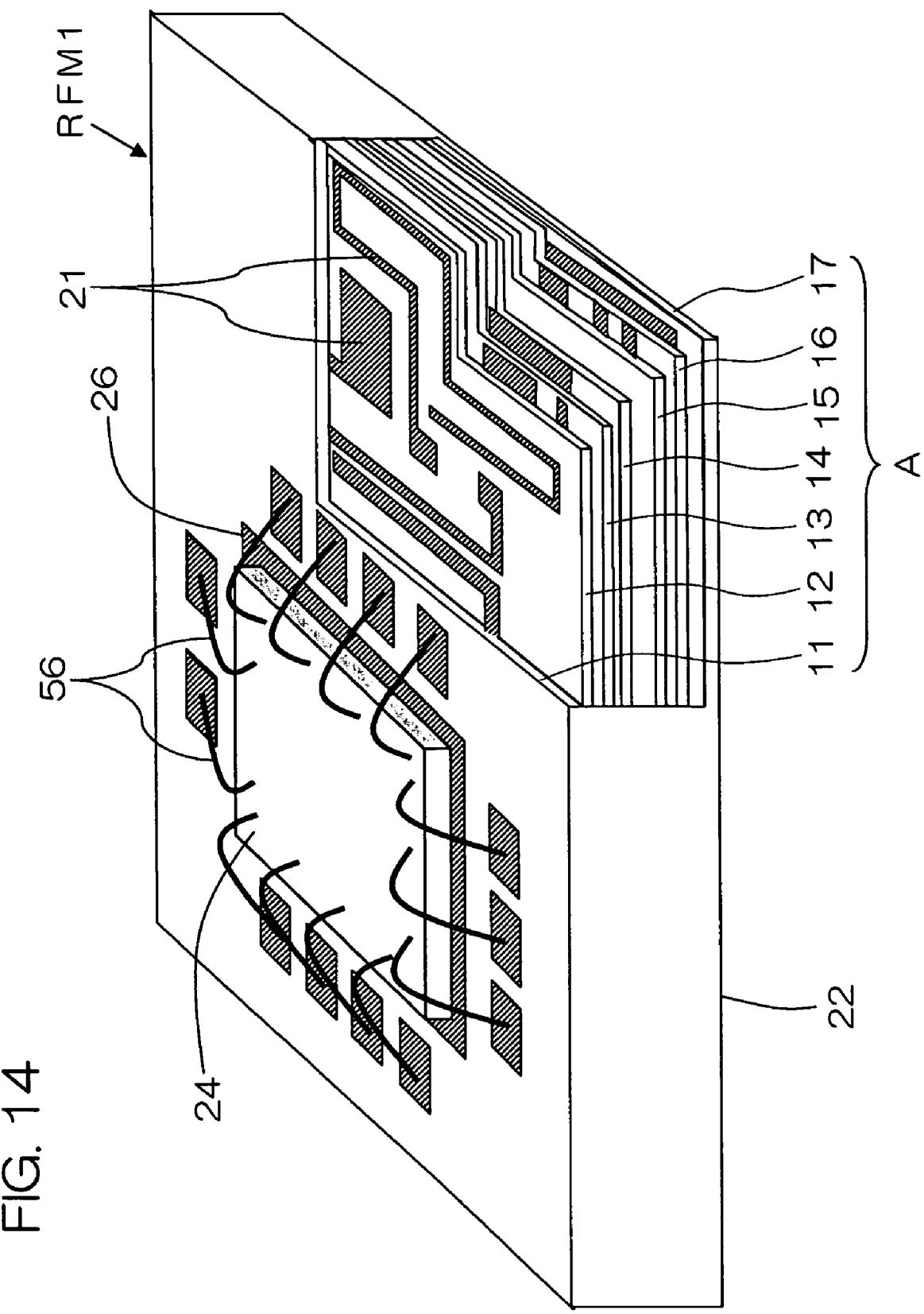
FIG. 14 is a partially cutaway perspective view showing the internal structure of a high-frequency module according to the present invention.
Figure 15:
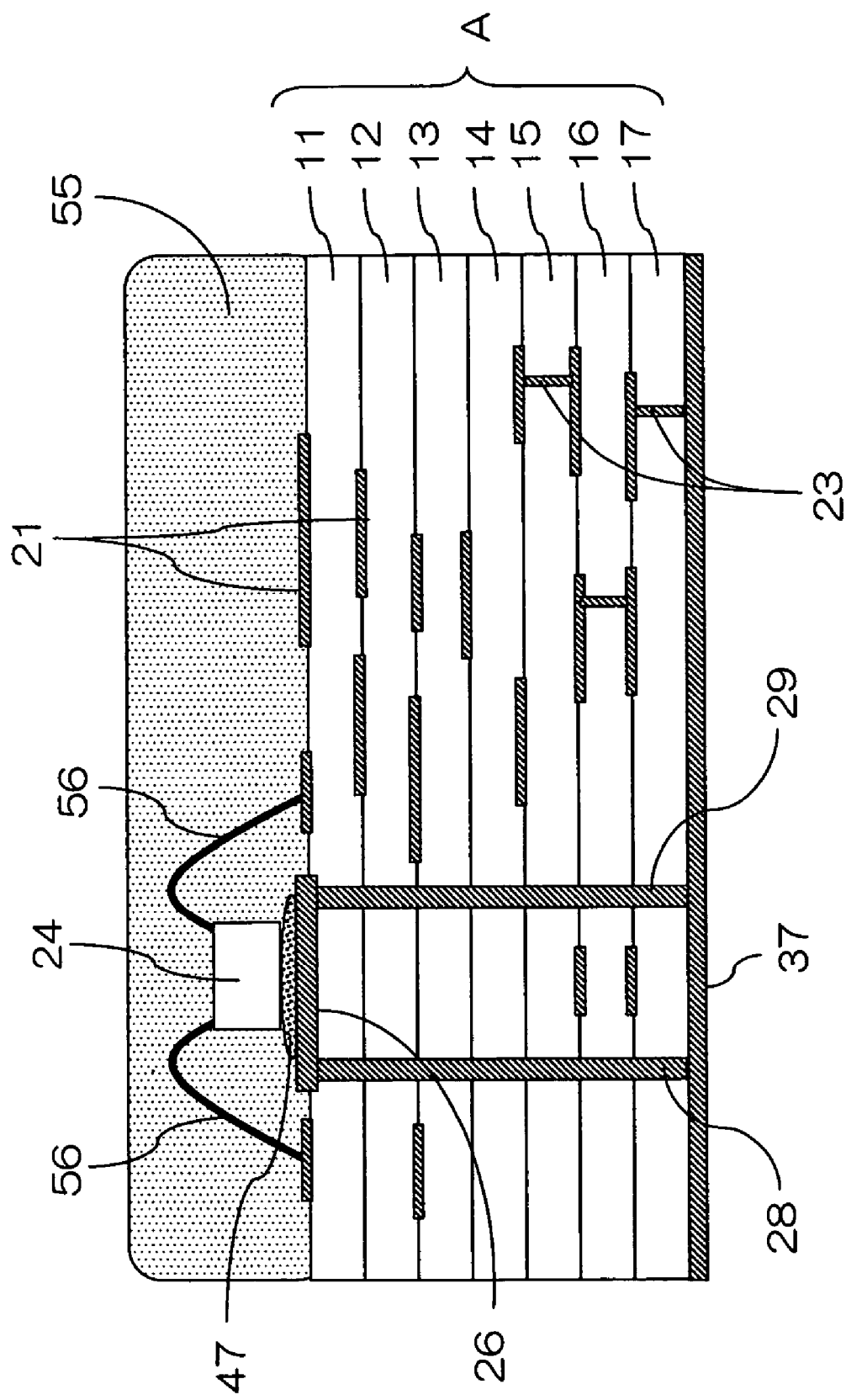
FIG. 15 is a schematic cross-sectional view showing the internal structure of the high-frequency module according to the present invention.
Figure 16:
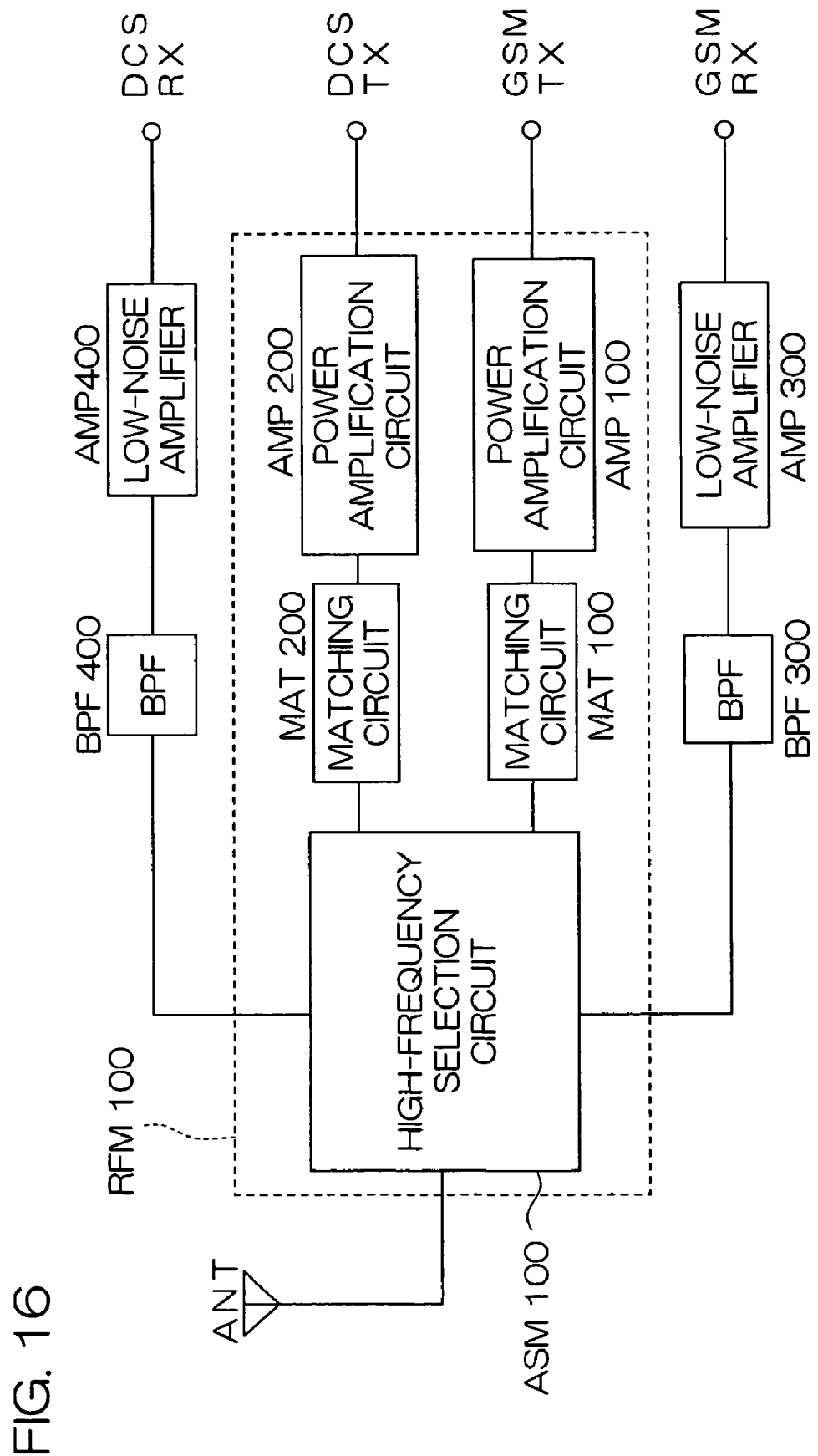
FIG. 16 is a block diagram of the high-frequency module.
Figure 17:
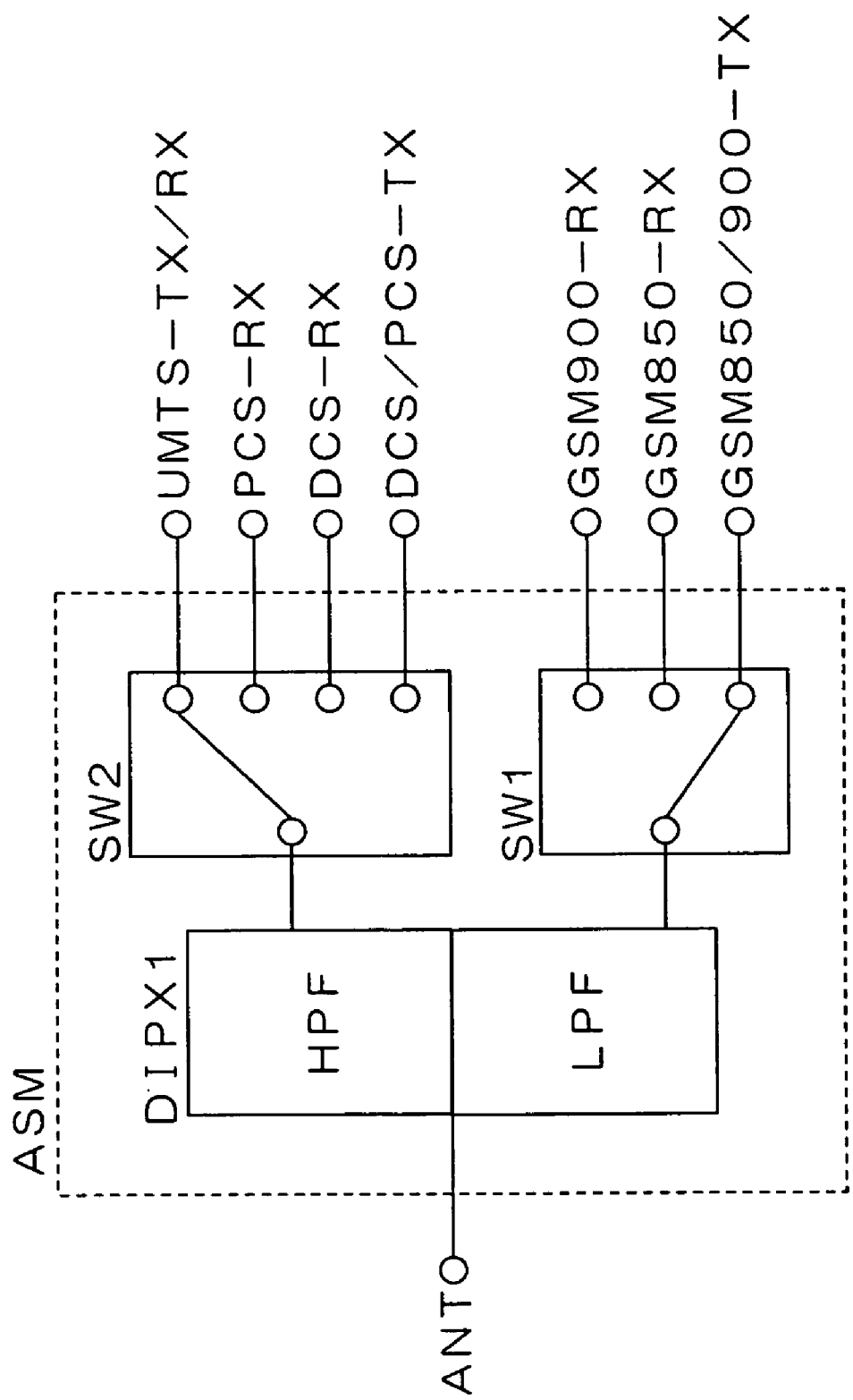
FIG. 17 is a block diagram of a conventional antenna switch module.
Figure 18:
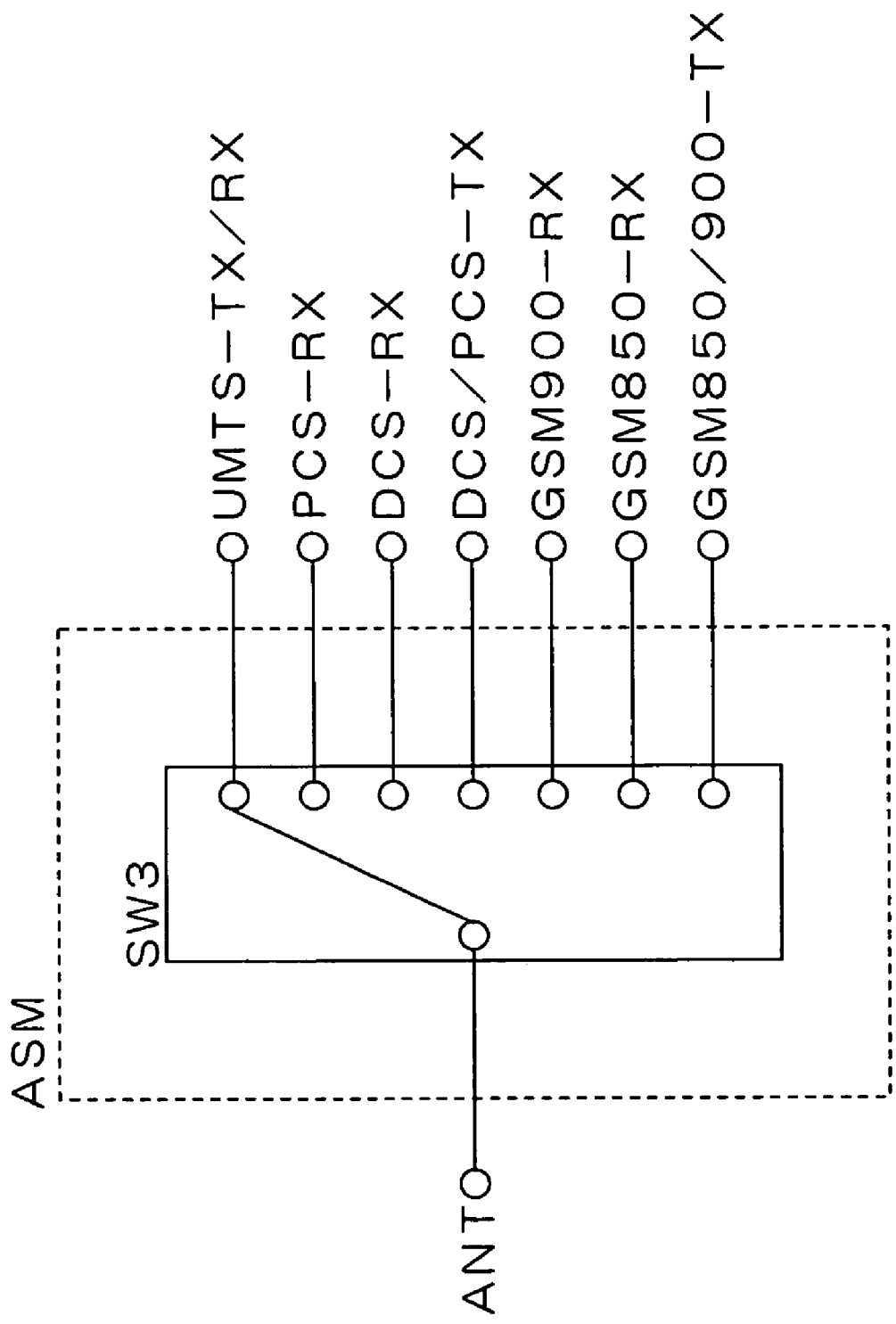
FIG. 18 is a block diagram of another conventional antenna switch module.

FIG. 14 is a partially cutaway perspective view of the high-frequency module RFM1. FIG. 15 is a schematic cross-sectional view of the high-frequency module RFM1.

As shown in FIGS. 14 and 15, the high-frequency module RFM1 is formed on a multi-layer substrate A that is formed by laminating a dielectric layer and a conductor layer.

The multi-layer substrate A is formed by laminating dielectric layers 11 to 17 having the same size and shape. Between every two layers of the dielectric layers 11 to 17 is formed a conductor layer 21 having a predetermined pattern. Also, via-hole conductors 23 required to form or connect circuits via a plurality of layers are formed appropriately in each of the dielectric layers 11 to 17.

The dielectric layers 11 to 17 are made of, for example, ceramic for low-temperature calcinations, while the conductor layer 21 is made of low-resistance conductor such as copper or silver. Such kind of multi-layer substrates are formed using a well-known multi-layer ceramic technology. For example, after applying conductive paste on the surface of ceramic green sheets to form conductor patterns composing each of the above-described circuits, the ceramic green sheets are laminated, and thermocompressed and calcinated at a required pressure and temperature to be a multi-layer substrate.

Inside the multi-layer substrate A are formed patterns of a matching circuit MAT, a low-pass filter LPF, a demultiplexing circuit DIP, etc. These patterns are arranged with no overlap when viewed from above the multi-layer substrate A. This can prevent interference between the circuits and thereby achieve good filtering characteristics, having potential for reduction in loss and suppression of higher harmonics.

The semiconductor switches SW1 and SW2 of the high-frequency module RFM1 according to the present invention are integrated on one chip. This chip will hereinafter be indicated by the numeral "24". The chip 24 is mounted on the upper surface of the multi-layer substrate A via a die pad 26 with an area larger than that of the mounting surface of the chip 24 using a conductive adhesive containing Ag or AuSn mixed with adhesive or an organic-resin non-conductive adhesive 47.

It is noted that the high-frequency switches SW1 and SW2 and the decoder circuit DEC1 may be formed integrally on the chip 24. Alternatively, the decoder circuit DEC1 maybe mounted as another chip.

Then, a power amplification circuit, an automatic power control circuit, and a band-pass filter such as a SAW filter, which are connected to the terminals GSM850/900-TX and DCS/PCS-TX, are mounted integrally inside the high-frequency module RFM1 shown in the present embodiment.

Further, a duplexer, a power amplification circuit, an automatic power control circuit, and a band-pass filter such as a SAW filter, which are connected to the terminals CDMA Cellular and UMTS, are mounted integrally inside the high-frequency module RFM1 shown in the present embodiment.

Also, a band-pass filter such as a SAW filter, which is connected to the terminals GSM850-RX, GSM900-RX, DCS-RX, and PCS-RX, is mounted integrally inside the high-frequency module RFM1 shown in the present embodiment.

The chip 24 is made up of a high-frequency monolithic semiconductor integrated circuit element having a GaAs J-FET structure, in which the circuit pattern is formed on a substrate consisting primarily of a GaAs (Gallium Arsenide) compound to achieve reduction in size and loss.

Then, signal terminals or ground terminals of the chip 24 composing the high-frequency switches SW1 and SW2 are connected electrically to elements incorporated in the substrate via bonding wires 56 and/or the conductive layer 21 on the surface of the multi-layer substrate A.

The upper surface of the multi-layer substrate A is sealed with sealing resin 55 such as epoxy resin, and in the vicinity of the side surface of the multi-layer substrate on the underside surface thereof is formed a signal terminal pattern 22 as an LGA (Land Grid Array) electrode.

It is noted that the upper surface and side surface of the multi-layer substrate A may be covered by a metal cap instead of sealing resin. The metal cap is fixed to an end face electrode for earthing, which is provided at a predetermined position on the side surface of the multi-layer substrate A, using conductor such as solder.

Then, incorporating circuit elements other than the chip 24 in the part under the surface on which the chip 24 is mounted can achieve the multiband-compliant high-frequency module RFM1 without increasing the size of the substrate.

In accordance with the present invention, applying the above-mentioned high-frequency module to a wireless communications device such as a mobile phone can provide a multiband-compliant wireless communications device in which GMS/DCS/PCS system and CDMA system are integrated, and also can reduce the size of the device, for example.

What is claimed is:

1. A high-frequency switching circuit arranged between a common antenna terminal and a transmission system and/or a reception system of a plurality of communication systems having different frequency bands or different communication methods, the circuit comprising:

two or more high-frequency switches provided correspondingly to the plurality of communication systems, each of the high-frequency switches having one antenna side terminal and two or more transmitting and/or receiving terminals;

a control circuit adapted to control switching of the two or more high-frequency switches; and a matching circuit capable of allowing passage of direct current and provided between antenna side terminals of the respective two or more high-frequency switches and the common antenna terminal, and wherein the antenna side terminals of the two or more high-frequency switches are connected to each other in a manner capable of allowing passage of direct current via the matching circuit, and the control circuit is adapted to control in such a manner that when one path through one of the transmitting and/or receiving terminals of any of the high-frequency switches is turned on, the other paths of the high-frequency switch and all paths of the other high-frequency switches are turned off.

2. The high-frequency switching circuit according to claim 1, wherein the voltage at the antenna side terminals is 1V or more under the state where the control circuit controls one path of any of the high-frequency switches to be on and the other paths of the high-frequency switch and all paths of the other high-frequency switches to be off.

3. The high-frequency switching circuit according to claim 1, wherein each of the high-frequency switches is formed by a semiconductor integrated circuit element.

4. The high-frequency switching circuit according to claim 1, wherein the matching circuit capable of allowing passage of direct current is a low-pass filter.

5. The high-frequency switching circuit according claims 1, wherein a filter circuit for attenuating higher harmonics of a transmitted signal is connected in each of the transmitting/receiving terminals from the respective high-frequency switching circuits via an antenna.

6. The high-frequency switching circuit according to claim 5, wherein the filter circuit is a low-pass or a band-pass filter.

7. The high-frequency switching circuit according to claim 1, wherein a demultiplexing circuit for multiplexing and/or demultiplexing transmitted signals and/or a reception signal of each of the communication systems is connected to each terminal other than the antenna side terminals of the high-frequency switches, which is connected with a transmitting circuit and/or a receiving circuit.

8. The high-frequency switching circuit according to claim 1, wherein a high-pass or a band-pass filter for attenuating high-voltage surge is provided between the common antenna terminal and the high-frequency switches.

9. The high-frequency switching circuit according to claim 1, wherein an antenna side terminal of any of the two or more high-frequency switches and the common antenna terminal are connected directly.

10. The high-frequency switching circuit according to claim 1, wherein the control circuit is formed by a semiconductor integrated circuit element including one or more high-frequency switch.

11. A high-frequency module with the high-frequency switching circuit according to claim 1 mounted thereon, wherein the high-frequency switches composing the high-frequency switching circuit are mounted on the surface of a multi-layer substrate that is formed by laminating a dielectric layer and a conductor layer alternately.

12. The high-frequency module according to claim 11, wherein the matching circuit, the demultiplexing circuits, and/or the filter circuits composing the high-frequency switching circuit are formed inside the multi-layer substrate.

13. The high-frequency module according to claim 12, wherein the pattern of the matching circuit, the demultiplexing circuits, and/or the filter circuits formed inside the multi-layer substrate is arranged with no overlap when viewed from above the multi-layer substrate.

14. A wireless communications device mounted with the high-frequency module according to claim 11.

15. A high-frequency switching circuit arranged between a common antenna terminal and a transmission system and/or a reception system of a plurality of communication systems having different frequency bands or different communication methods, the circuit comprising:

two or more high-frequency switches provided correspondingly to the plurality of communication systems, each of the high-frequency switches having one antenna side terminal and two or more transmitting and/or receiving terminals; and a control circuit adapted to control switching of the two or more high-frequency switches, wherein antenna side terminals of the respective two or more high-frequency switches and the common antenna terminal are connected directly, the antenna side terminals of the two or more high-frequency switches are connected to each other in a manner capable of allowing passage of direct current via the matching circuit, and the control circuit is adapted to control in such a manner that when one path through one of the transmitting and/ or receiving terminals of any of the high-frequency switches is turned on, the other paths of the high-frequency switch and all paths of the other high-frequency switches are turned off.

16. The high-frequency switching circuit according to claim 15, wherein the voltage at the antenna side terminals is 1V or more under the state where the control circuit controls one path of any of the high-frequency switches to be on and the other paths of the high-frequency switch and all paths of the other high-frequency switches to be off 17. The high-frequency switching circuit according to claim 15, wherein each of the high-frequency switches is formed by a semiconductor integrated circuit element.

18. The high-frequency switching circuit according to claim 15, wherein a filter circuit for attenuating harmonics of a transmitted signal is connected in each of the transmitting/receiving terminals from the respective high-frequency switching circuits via an antenna.

19. The high-frequency switching circuit according to claim 18, wherein the filter circuit is a low-pass or a band-pass filter.

20. The high-frequency switching circuit according to claim 15, wherein a demultiplexing circuit for multiplexing and/or demultiplexing transmitted signals and/or a reception signal of each of the communication systems is connected to each terminal other than the antenna side terminals of the high-frequency switches, which is connected with a transmitting circuit and/or a receiving circuit.

21. The high-frequency switching circuit according to claim 15, wherein a high-pass or a band-pass filter for attenuating high-voltage surge is provided between the common antenna terminal and the high-frequency switches.

22. The high-frequency switching circuit according to claim 15, wherein the control circuit is formed by a semiconductor integrated circuit element including one or more high-frequency switch.

23. A high-frequency module with the high-frequency switching circuit according to claim 15 mounted thereon, wherein the high-frequency switches composing the high-frequency switching circuit are mounted on the surface of a multi-layer substrate that is formed by laminating a dielectric layer and a conductor layer alternately.

24. The high-frequency module according to claim 23, wherein the matching circuit, the demultiplexing circuits, and/or the filter circuits composing the high-frequency switching circuit are formed inside the multi-layer substrate.

25. The high-frequency module according to claim 24, wherein the pattern of the matching circuit, the demultiplexing circuits, and/or the filter circuits formed inside the multi-layer substrate is arranged with no overlap when viewed from above the multi-layer substrate.

26. A wireless communications device mounted with the high-frequency module according to claim 23.

* * * * *